United States Patent
Tsuji et al.

(10) Patent No.: US 10,919,414 B2
(45) Date of Patent: Feb. 16, 2021

(54) SLIDING DEVICE

(71) Applicants: TOYOTA BOSHOKU KABUSHIKI KAISHA, Aichi (JP); TOYOTA JIDOSHA KABUSHIKI KAISHA, Aichi (JP)

(72) Inventors: Eiichiro Tsuji, Aichi (JP); Yuji Kuroda, Aichi (JP); Kazuhiro Tsuboi, Aichi (JP); Masanori Fukuoka, Aichi (JP); Tomoya Takeuchi, Aichi (JP)

(73) Assignees: TOYOTA BOSHOKU KABUSHIKI KAISHA, Aichi (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/048,706

(22) Filed: Jul. 30, 2018

(65) Prior Publication Data
US 2019/0061566 A1 Feb. 28, 2019

(30) Foreign Application Priority Data

Aug. 30, 2017 (JP) .............................. JP2017-166225
Aug. 30, 2017 (JP) .............................. JP2017-166226
Aug. 30, 2017 (JP) .............................. JP2017-166227

(51) Int. Cl.
*B60N 2/07* (2006.01)
*B60N 2/06* (2006.01)
*B60N 2/08* (2006.01)

(52) U.S. Cl.
CPC ........... *B60N 2/0725* (2013.01); *B60N 2/067* (2013.01); *B60N 2/0705* (2013.01); *B60N 2/0715* (2013.01); *B60N 2/08* (2013.01)

(58) Field of Classification Search
CPC .... B60N 2/0725; B60N 2/067; B60N 2/0705; B60N 2/0715; B60N 2/08; B60N 2/0818;
(Continued)

(56) References Cited

U.S. PATENT DOCUMENTS 7,992,834 B2 * 8/2011 Kojima ................ B60N 2/0725
                                                            248/429
8,393,590 B2 * 3/2013 Kato .................... B60N 2/0702
                                                            248/394
(Continued)

FOREIGN PATENT DOCUMENTS

CN        101801717 A     8/2010
DE    102014219171 A1    4/2015
(Continued)

OTHER PUBLICATIONS

German Office Action dated Oct. 10, 2019 in the related German Patent Application No. 102018214161.4 and its English translation.
(Continued)

*Primary Examiner* — Muhammad Ijaz
(74) *Attorney, Agent, or Firm* — Greenblum & Bernstein, P.L.C.

(57) ABSTRACT

Disclosed is one example of a sliding device allowing for reliable sliding of members that close an opening of a fixed rail. The sliding device includes: a fixed rail including an opening arranged in a longitudinal direction of the fixed rail; a movable rail slidable with respect to the fixed rail in a state where at least part of the movable rail is exposed through the opening; a first closure member slidable with respect to the fixed rail and capable of closing at least part of the opening, the first closure member receiving a force from the movable rail to thereby slide; a first engaging portion provided to the first closure member and disengageably engaging with a first engaged portion provided to the movable rail; and a second engaging portion provided to the first closure member and disengageably engaging with a second engaged portion provided to the fixed rail.

7 Claims, 20 Drawing Sheets

(58) Field of Classification Search
CPC .. B60N 2/0875; B60N 2/0881; B60N 2/0722; B60N 2/07
USPC ............ 248/424, 425, 429, 430; 296/65.13, 296/65.14, 65.15
See application file for complete search history.

(56) References Cited

U.S. PATENT DOCUMENTS

| | | | |
|---|---|---|---|
| 2004/0100388 A1* | 5/2004 | Yoshida | B60N 2/0276 340/686.1 |
| 2005/0230591 A1* | 10/2005 | Smith | B60N 2/0715 248/429 |
| 2011/0233365 A1 | 9/2011 | Kato et al. | |
| 2015/0069202 A1* | 3/2015 | Hayashi | B60N 2/06 248/429 |
| 2015/0090853 A1* | 4/2015 | Arakawa | B60N 2/0725 248/429 |
| 2015/0145298 A1* | 5/2015 | Wottke | B60N 2/0725 297/243 |
| 2016/0236592 A1* | 8/2016 | Peniche | F16B 2/22 |
| 2019/0061563 A1* | 2/2019 | Tsuji | B60N 2/0715 |
| 2019/0061565 A1* | 2/2019 | Tsuji | B60N 2/0715 |
| 2019/0061566 A1* | 2/2019 | Tsuji | B60N 2/0722 |
| 2019/0308526 A1* | 10/2019 | Gross | B64D 11/0696 |

FOREIGN PATENT DOCUMENTS

| | | |
|---|---|---|
| EP | 2876048 A1 | 5/2015 |
| JP | H04109635 U | 9/1992 |
| JP | 6-27296 | 4/1994 |
| JP | 2014233996 A | 12/2014 |

OTHER PUBLICATIONS

German Office Action dated Oct. 10, 2019 in the related German Patent Application No. 102018214162.2 and its English translation.

U.S. non-final Office Action dated May 30, 2019 in the related U.S. Appl. No. 16/048,764.

Final Office Action dated Jan. 15, 2020 in related U.S. Appl. No. 16/048,764.

Notice of Allowance and Fee(s) Due dated Jan. 23, 2020 in related U.S. Appl. No. 16/048,726.

Notice of Allowance and Fee(s) Due dated Feb. 26, 2020 in related U.S. Appl. No. 16/048,764.

Japanese Notice of Reasons for Refusal dated Apr. 21, 2020 in the corresponding Japanese patent application No. 2017-166227 and its English translation.

Japanese Notice of Reasons for Refusal dated Apr. 28, 2020 in the corresponding Japanese patent application No. 2017-166226 and its English translation.

Japanese Decision to Grant a Patent dated Apr. 28, 2020 in the corresponding Japanese patent application No. 2017-166225 and its English translation.

Corrected Notice of Allowability dated May 21, 2020 in the related U.S. Appl. No. 16/048,726.

Corrected Notice of Allowability dated May 21, 2020 in the related U.S. Appl. No. 16/048,764.

Corrected Notice of Allowability dated Jun. 8, 2020 in the related U.S. Appl. No. 16/048,764.

Corrected Notice of Allowability dated Jul. 8, 2020 in the related U.S. Appl. No. 16/048,764.

Chinese First Office Action dated Sep. 29, 2020 in the counterpart Chinese patent application No. 201811002021.1 (and machine-generated English translation thereof).

Chinese First Office Action dated Sep. 29, 2020 in the corresponding Chinese patent application No. 201811001010.1 (and machine-generated English translation thereof.

Notice of Allowance dated Apr. 15, 2020 in related U.S. Appl. No. 16/048,764.

Notice of Reasons for Rejection dated Oct. 20, 2020 in the counterpart Japanese patent application No. 2018-207523 and its machine-generated English translation.

* cited by examiner

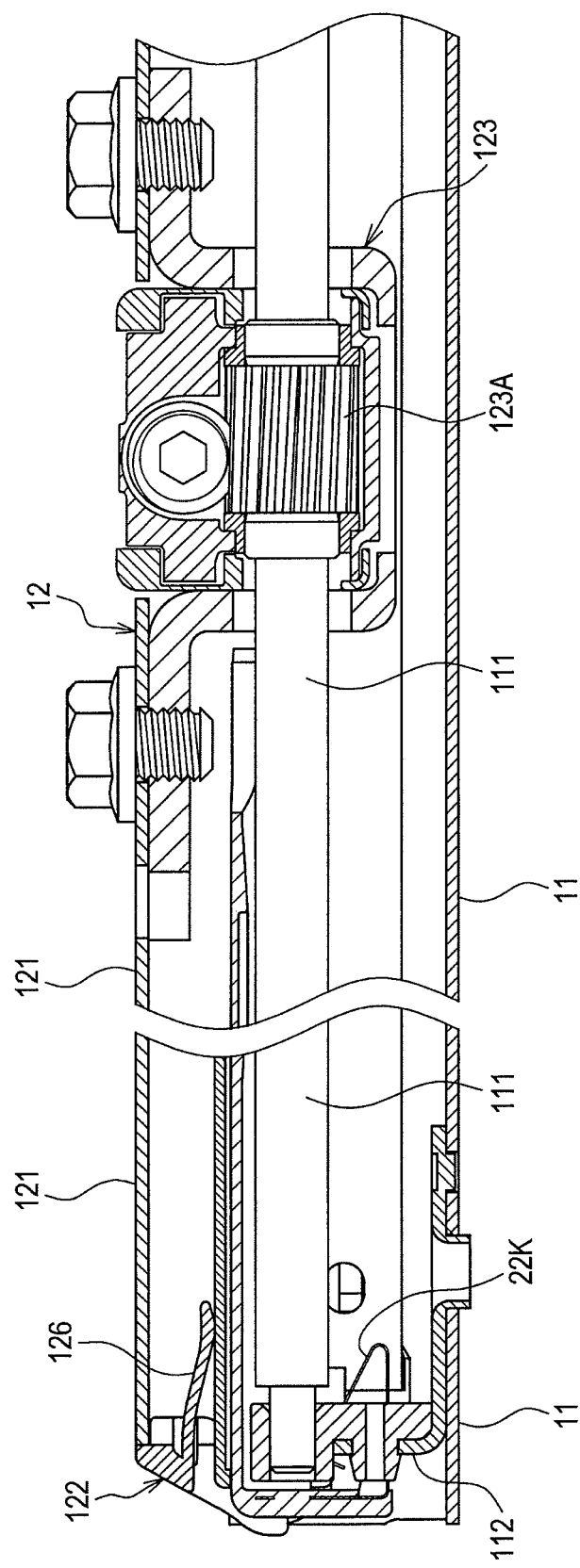
FIG. 6
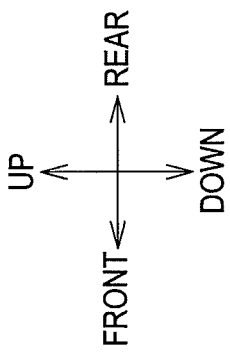

SLIDING DEVICE

CROSS-REFERENCE TO RELATED APPLICATIONS

This application claims the benefit of Japanese Patent Applications Nos. 2017-166225, 2017-166226, and 2017-166227 each filed on Aug. 30, 2017 with the Japan Patent Office, the entire disclosure of which is incorporated herein by reference.

BACKGROUND

The present disclosure relates to a sliding device that supports a seat body of a vehicle seat in a slidable manner.

For example, there is disclosed, in Unexamined Japanese Utility Model Application Publication No. H6-27296, a sliding device comprising an inner cover body and an outer cover body that slide in conjunction with an upper rail. The inner cover body and the outer cover body are members to cover the inside of a lower rail.

A longitudinal end of the upper rail and the outer cover body are coupled to each other with a coil spring. A protrusion provided to the upper rail is slidably fitted into an elongated hole arranged in the inner cover body.

In such a configuration, when the upper rail slides with respect to the lower rail, the inner cover body slides in conjunction with the sliding of the upper rail, and the outer cover body slides in conjunction with the sliding of the inner cover body.

SUMMARY

In the sliding device disclosed in the aforementioned publication, it is difficult to reliably slide the outer cover body in conjunction with the sliding of the upper rail because the outer cover body slides in conjunction with the sliding of the inner cover body.

In view of the aforementioned point, in one aspect of the present disclosure, it is desirable to provide a sliding device allowing for reliable sliding of members corresponding to the cover bodies.

One aspect of the present disclosure is a sliding device. The sliding device comprises: a fixed rail fixed to a vehicle, the fixed rail comprising an opening opened upward, the opening being arranged in a longitudinal direction of the fixed rail; a movable rail to which a seat body of a vehicle is fixed, the movable rail being slidable with respect to the fixed rail in a state where at least part of the movable rail is exposed through the opening; a first closure member slidable with respect to the fixed rail and capable of closing at least part of the opening, the first closure member receiving a force from the movable rail to thereby slide; a first engaging portion provided to the first closure member, the first engaging portion disengageably engaging with a first engaged portion provided to the movable rail; and a second engaging portion provided to the first closure member, the second engaging portion disengageably engaging with a second engaged portion provided to the fixed rail.

In such a configuration, when the movable rail is positioned within the fixed rail, a position of the first closure member is maintained by engagement of the second engaged portion with the second engaging portion. When part of the movable rail is positioned outside of the fixed rail, the first engaged portion and the first engaging portion are engaged with each other and also the engagement of the second engaged portion with the second engaging portion is released, thereby enabling the first closure member to slide integrally with the movable rail. Accordingly, the first closure member can reliably slide together with the movable rail.

The sliding device may be configured such that, at a forward movement in which a longitudinal end of the movable rail slides from a position inside the fixed rail to a position outside the fixed rail, an engagement state of the second engaging portion is released after the first engaging portion has entered an engagement state, and such that, at a backward movement in which the movable rail slides in a direction opposite to that of the forward movement, the engagement state of the first engaging portion is released after the second engaging portion has entered the engagement state.

This enables the first closure member to reliably slide integrally with the movable rail when the movable rail moves forward.

The case in which "a longitudinal end of the movable rail slides from a position inside the fixed rail to a position outside the fixed rail" may be either a case in which the movable rail slides toward a front side or a case in which the movable rail slides toward a rear side.

The case in which "the movable rail slides in a direction opposite to that of the forward movement" may be either a case in which the movable rail makes a backward movement toward the rear side or a case in which the movable rail makes a backward movement toward the front side.

The first engaging portion may be elastically displaceable. Further, the first engaging portion, when in a non-engagement state, may apply an elastic force for maintaining the engagement state of the second engaging portion to the second engaging portion or to the second engaged portion.

In such a configuration, when the movable rail slides within the fixed rail, the first closure member can be reliably inhibited from sliding in conjunction with such sliding of the movable rail.

The first engaging portion may be an elastically displaceable portion formed by a bent metal strip member. This can improve durability of the first engaging portion as compared with a case in which the first engaging portion is formed of resin.

The movable rail may comprise: a rail body of metal to which the seat body is fixed; and an end cap of resin attached to a longitudinal end of the rail body and comprising the first engaged portion. This makes it possible to easily manufacture the first engaged portion.

The sliding device may further comprise a second closure member slidable with respect to the fixed rail and capable of closing at least part of the opening in cooperation with the first closure member. The second closure member may be in sliding contact with an outside wall surface of the first closure member and comprises a pressed portion configured to contact the movable rail. The second closure member may receive a pressing force from the movable rail to thereby slide. When the first engaging portion is in engagement with the first engaged portion, the pressed portion may be held between the movable rail and the first closure member in sliding directions.

This enables the first closure member and the second closure member to integrally slide together with the movable rail when part of the movable rail is positioned outside of the fixed rail. Accordingly, the first closure member and the second closure member can reliably slide together with the movable rail.

The sliding device may further comprise: a screw rod arranged within the fixed rail and extending in the longitudinal direction of the fixed rail; and a retaining bracket that retains the screw rod. The movable rail may comprise a nut engaged with the screw rod. The second engaged portion may be provided to the retaining bracket. This makes it possible to reduce the number of components.

BRIEF DESCRIPTION OF THE DRAWINGS

An example embodiment of the present disclosure will be described below with reference to the accompanying drawings, in which:

FIG. 6 is a diagram showing the sliding device according to the embodiment;

DETAILED DESCRIPTION OF THE PREFERRED EMBODIMENTS

Figure 1:
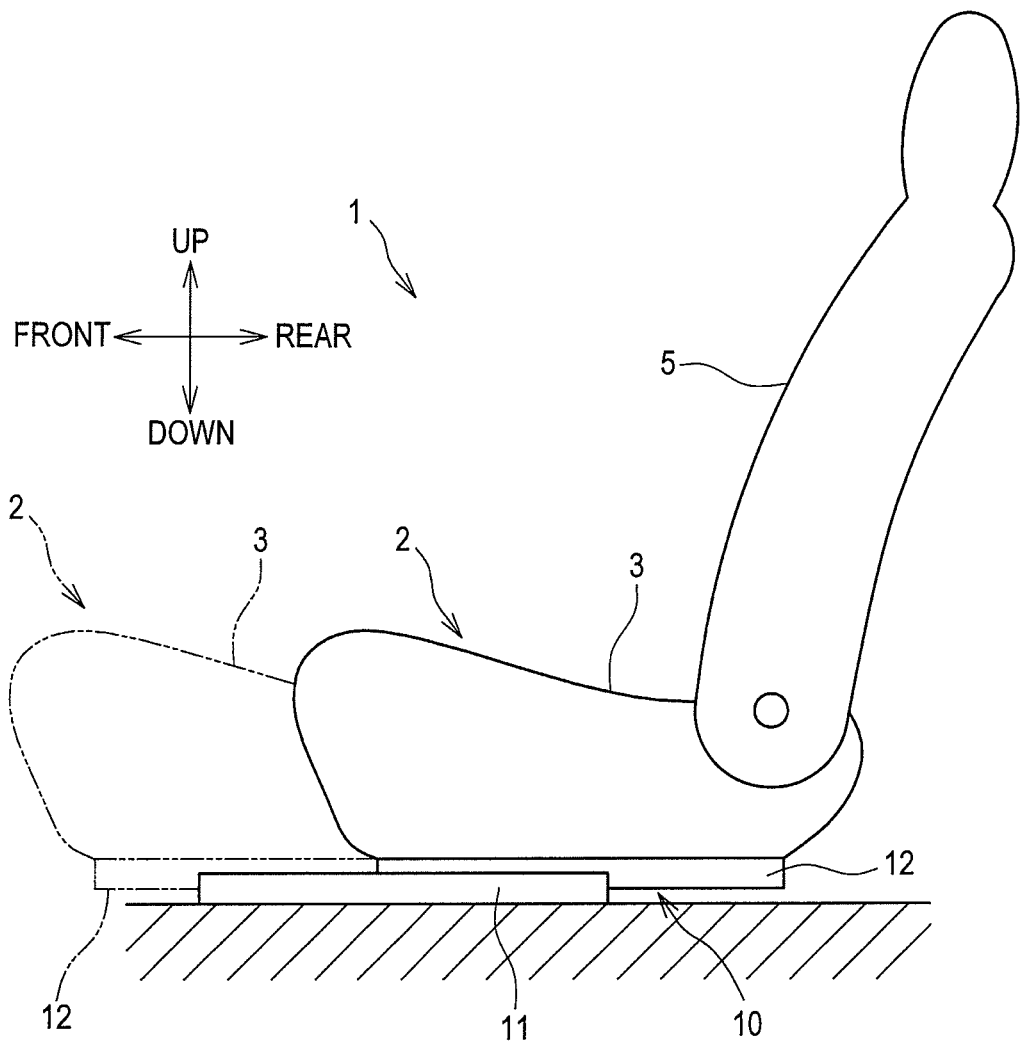
FIG. 1 is a diagram showing a vehicle seat according to the embodiment.

"Embodiments" described below are example embodiments falling within the technical scope of the present disclosure. In other words, invention-specifying matters and so on recited in the appended claims are not limited by specific configurations, structures, and the like, shown in the below-described embodiments.

At least a member or portion described with a reference numeral assigned thereto is at least one in number unless accompanied by a specifying term, such as "only one". In other words, two or more members or portions may be provided unless there is a specifying term, such as "only one".

Arrows and so on indicating directions shown in the figures are provided for the purpose of easy understanding of mutual relationships between the figures. The arrows and so on (directions) shown in the figures do not limit the scope of the present disclosure. Each direction is based on a state where a vehicle seat of the present embodiment is mounted to a vehicle.

An "occupant" herein means a crew of the vehicle and/or a user of the vehicle seat. Thus, the occupant includes a person who is actually not seated.

First Embodiment

1. Overview of Vehicle Seat

The present embodiment is a vehicle seat 1 as an automobile seat shown in FIG. 1. The vehicle seat 1 comprises at least a seat body 2 and a sliding device 10. The seat body 2 comprises a seat cushion 3 and a seatback 5.

The seat cushion 3 supports the occupant's buttocks. The seatback 5 supports the occupant's back. The sliding device 10 supports the seat body 2 in a slidable manner.

2. Sliding Device 2.1 Overview of Sliding Device

<Basic Configuration>

The seat body 2 is supported by two sliding devices 10. Of the two sliding devices 10, a first sliding device is arranged on a seat left side, and a second sliding device is arranged on a seat right side.

The first sliding device and the second sliding device have the same configuration. In an explanation below, the first sliding device (hereinafter simply referred to as the sliding device 10) will be described.

Figure 2:
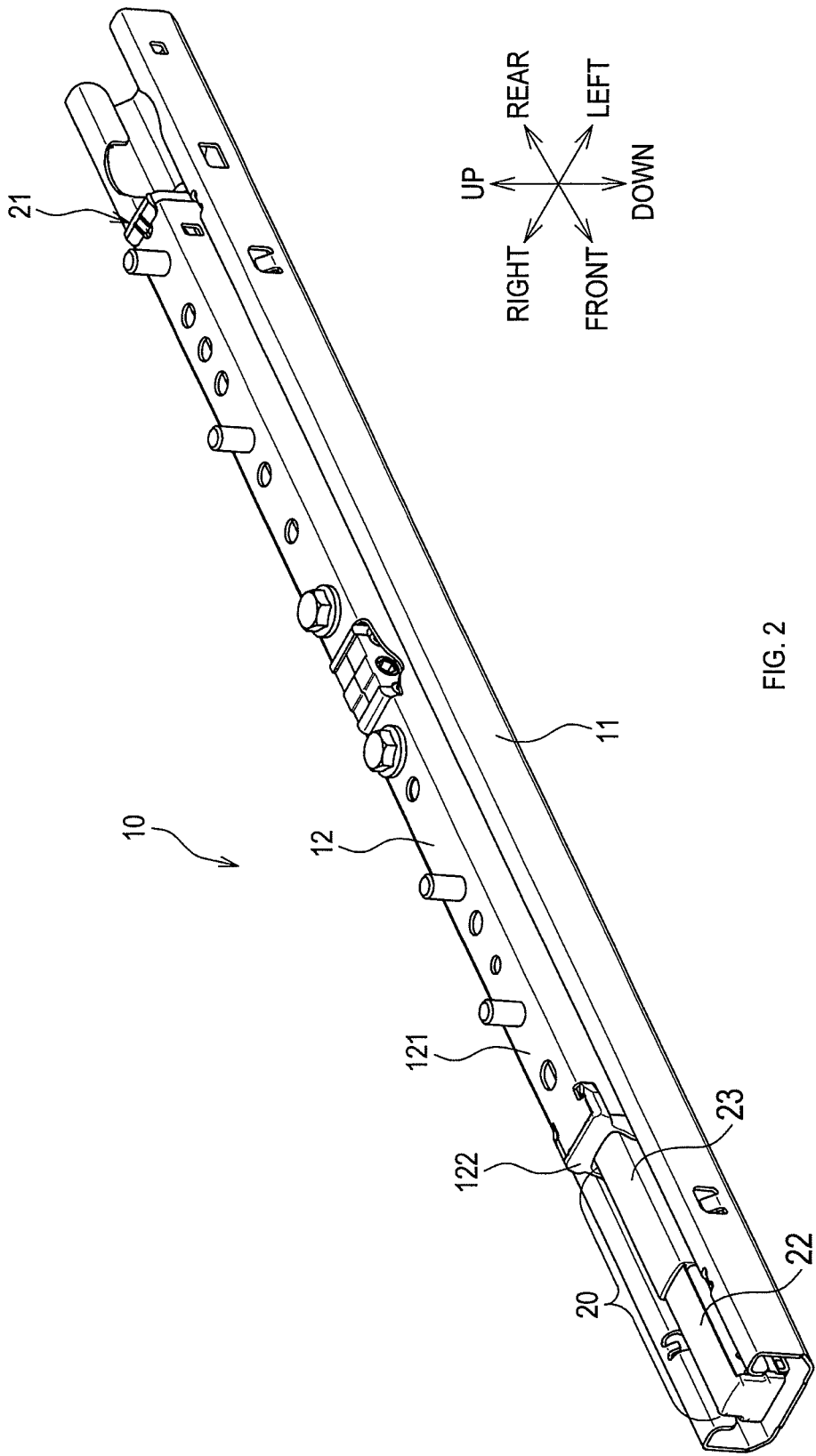
FIG. 2 is a diagram showing a sliding device according to the embodiment.
Figure 3:
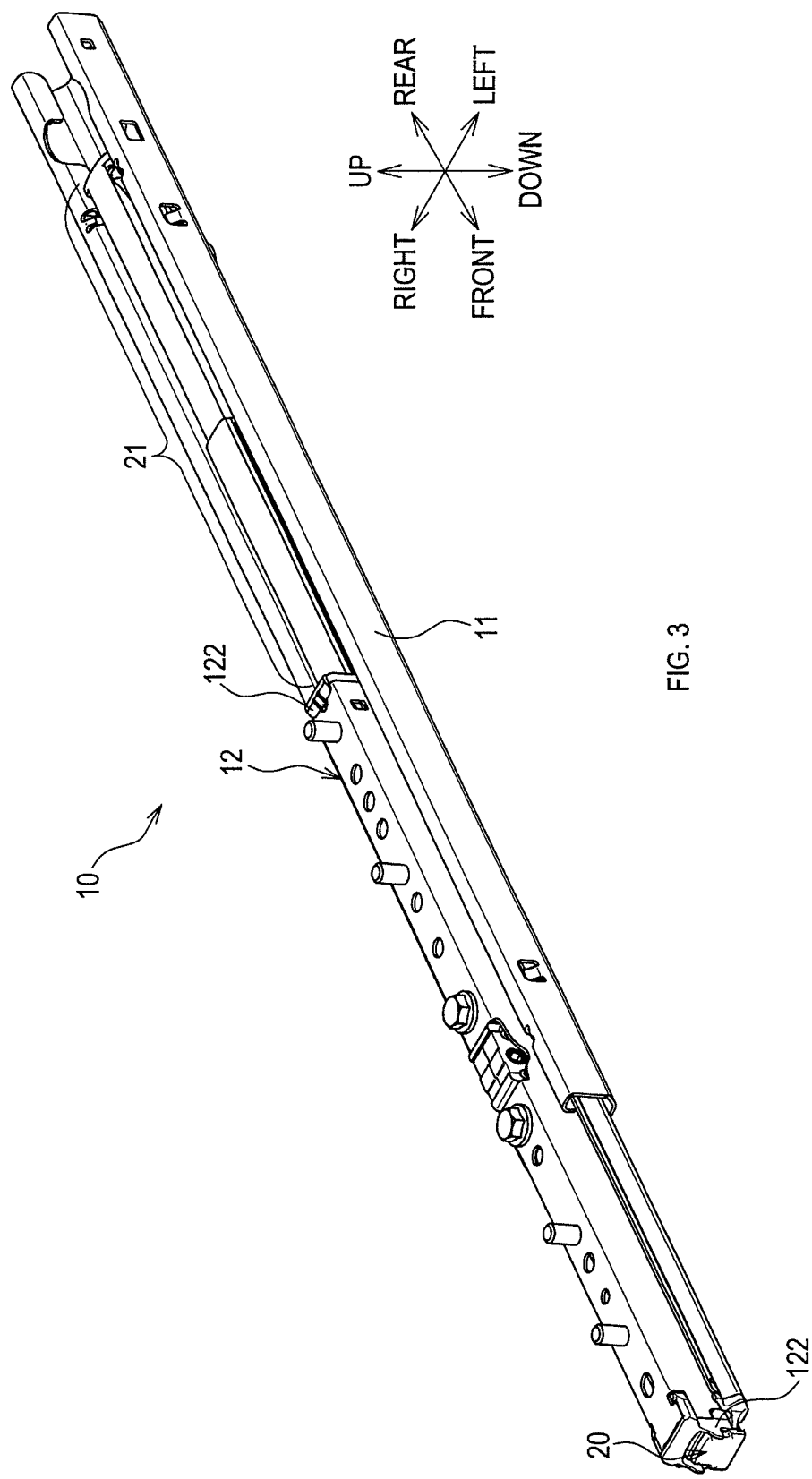
FIG. 3 is a diagram showing the sliding device according to the embodiment.

As shown in FIGS. 2 and 3, the sliding device 10 comprises at least a fixed rail 11, a movable rail 12, a first shutter portion 20, and a second shutter portion 21. The fixed rail 11 is a metal member fixed directly or indirectly to a vehicle.

Figure 4:
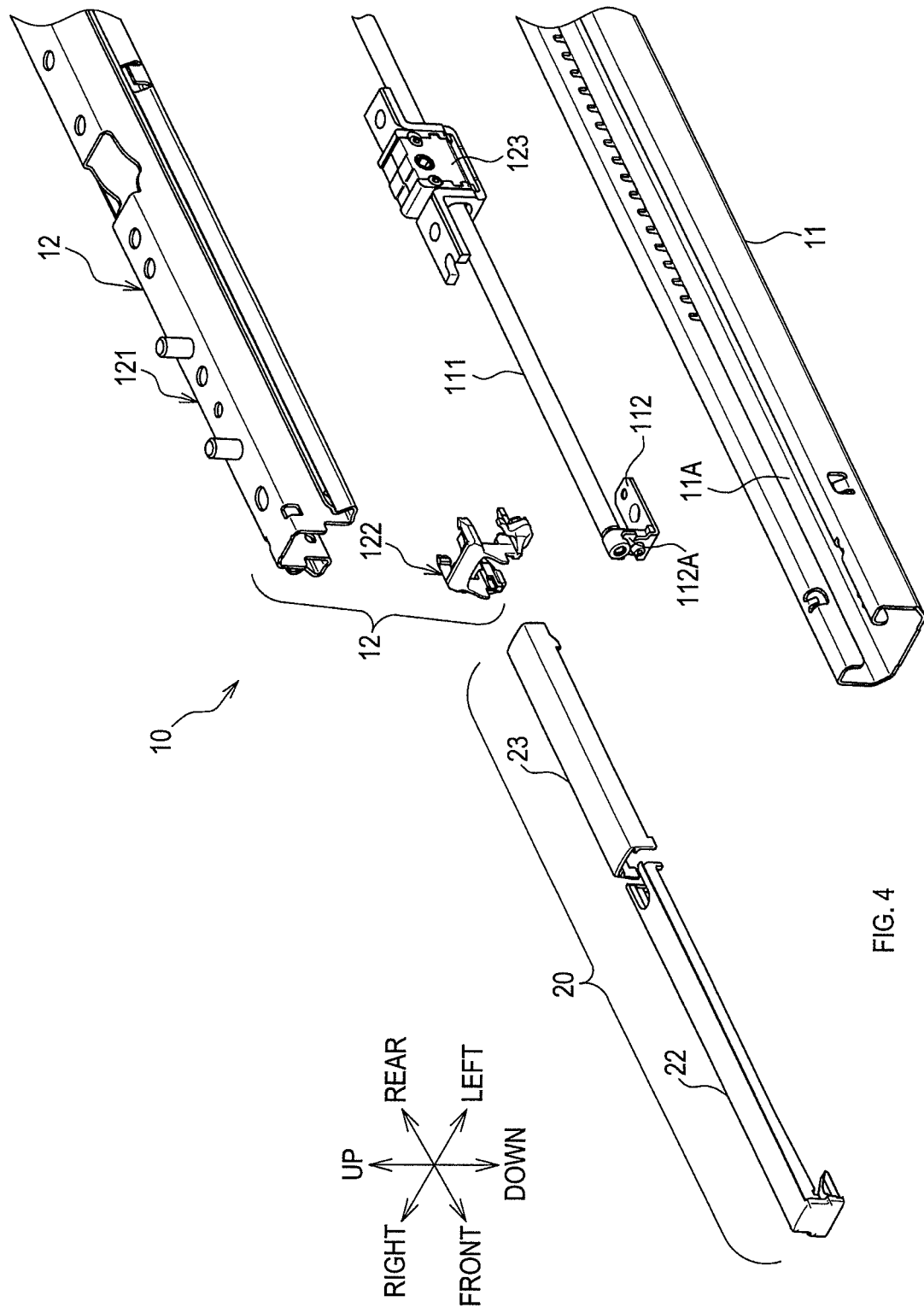
FIG. 4 is an exploded view of the sliding device according to the embodiment.

A longitudinal direction of the fixed rail 11 of the present embodiment corresponds to front-rear directions of the vehicle (automobile). As shown in FIG. 4, the fixed rail 11 is provided with an opening 11A opened upward, which is arranged in the longitudinal direction of the fixed rail 11.

The movable rail 12 is a member to which the seat body 2 is fixed. As shown in FIG. 2, the movable rail 12 is slidable with respect to the fixed rail 11 in a state where at least part of the movable rail 12 is exposed through the opening 11A.

The "state where at least part of the movable rail 12 is exposed through the opening 11A" refers to a case in which at least part of the movable rail 12 is visible when the occupant sees by eye the sliding device 10 from above.

Thus, the aforementioned "exposed state" is not limited to a state in which an upper end of the movable rail 12 is protruding from an upper end of the fixed rail 11. In other words, even when the upper end of the movable rail 12 is positioned lower than the upper end of the fixed rail 11, such a state may correspond to the "state where at least part of the movable rail 12 is exposed through the opening 11A".

As shown in FIG. 4, the movable rail 12 comprises at least a rail body 121 and an end cap 122. The rail body 121 is a metal member to which the seat body 2 is fixed. The end cap 122 is a resin member attached to a longitudinal end of the rail body 121 to cover the longitudinal end.

The movable rail 12 of the present embodiment comprises two end caps 122. Of the two end caps 122, a first end cap is attached to a first longitudinal end of the rail body 121.

Figure 13:
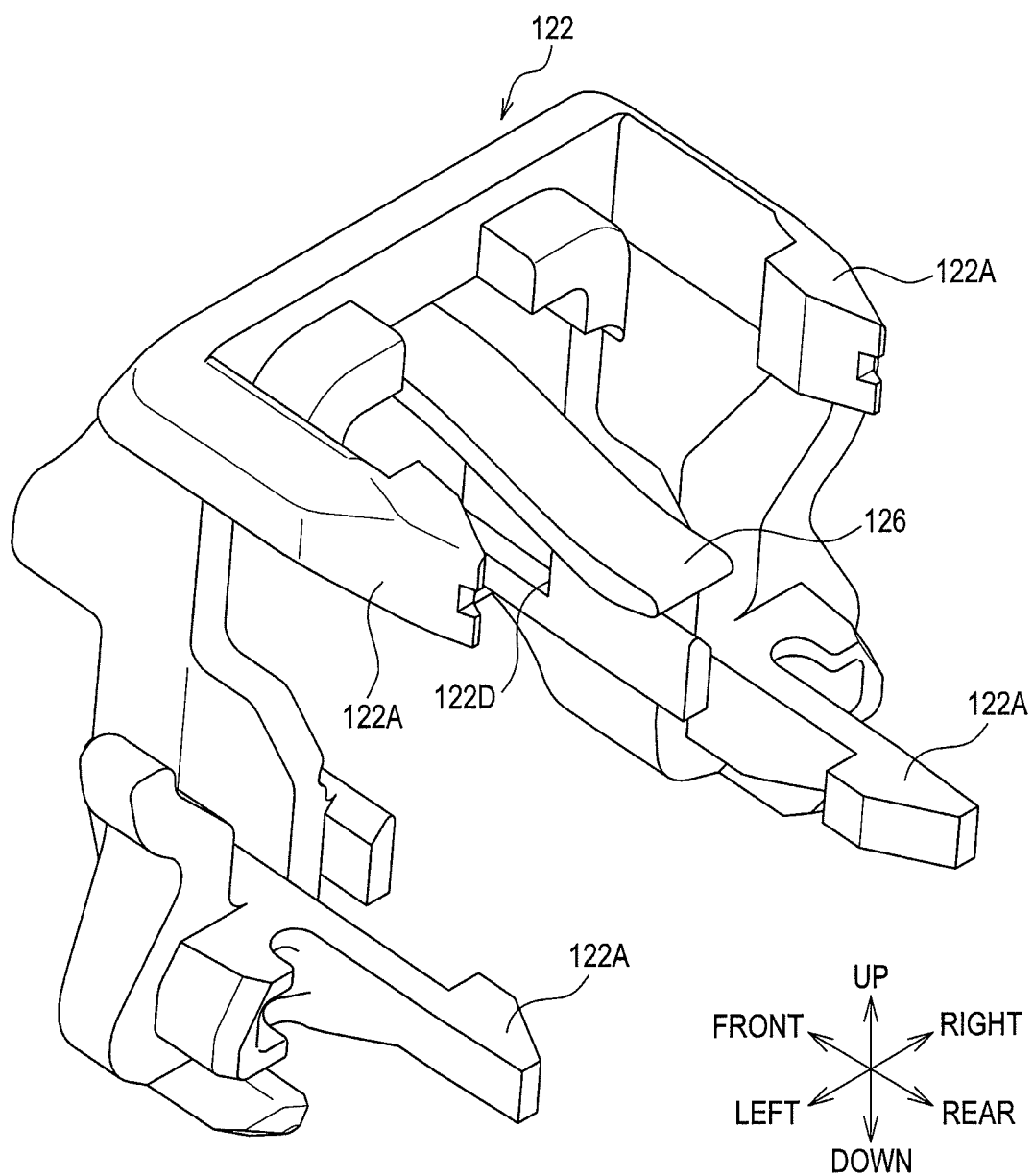
FIG. 13 is a diagram showing an end cap according to the embodiment.

Of the two end caps 122, a second end cap is attached to a second longitudinal end of the rail body 121. The two end caps 122 have the same shape, and are each fixed to the rail body 121 via an elastic locking portion 122A (see FIG. 13) having, for example, a snap-fit mechanism.

<Sliding Mechanism>

A sliding mechanism is a mechanism to move the seat body 2 with respect to the fixed rail 11. As shown in FIG. 4, the sliding mechanism comprises a screw rod 111, a retaining bracket 112, and a nut portion 123.

Figure 5:
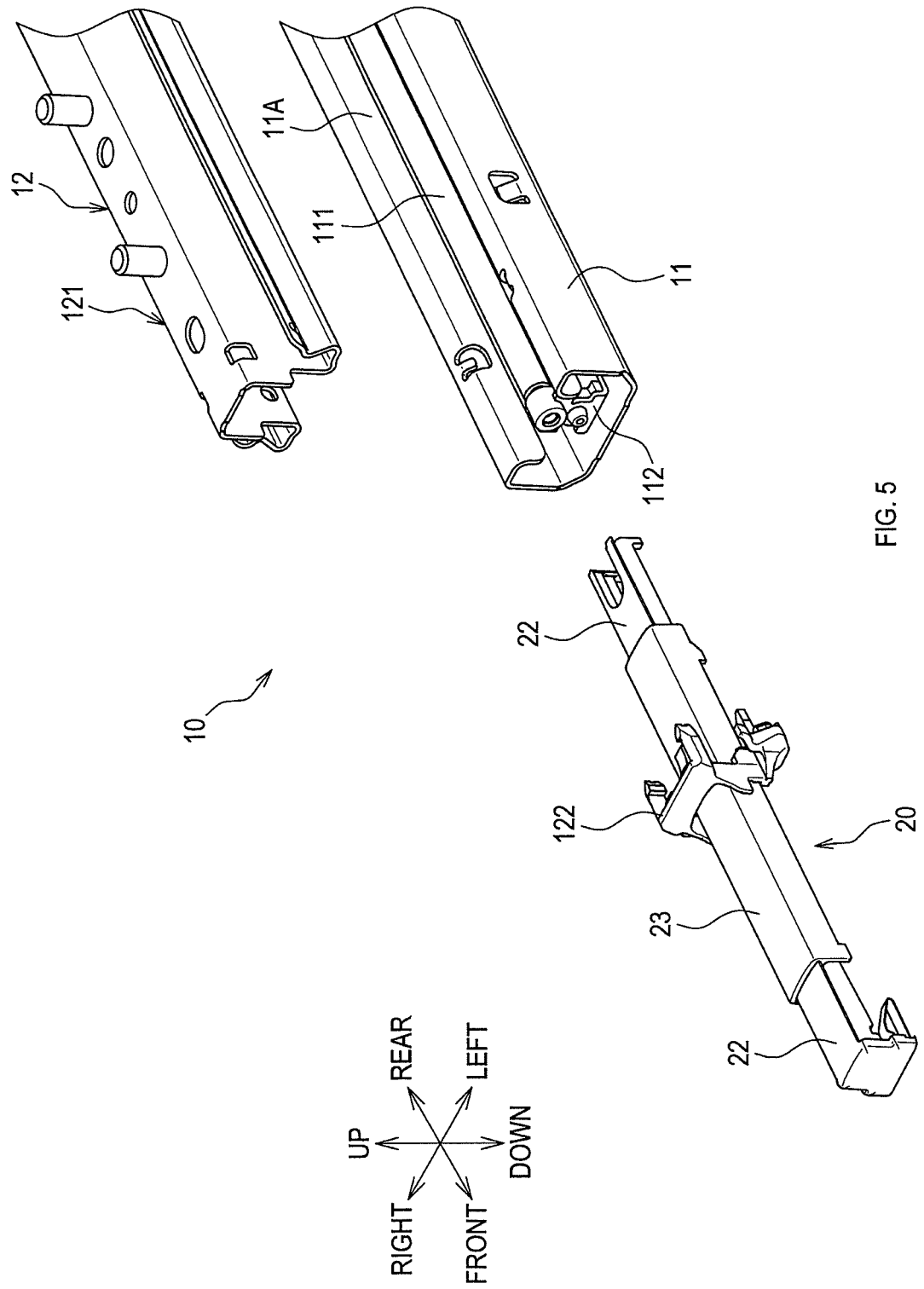
FIG. 5 is an exploded view of the sliding device according to the embodiment.

As shown in FIG. 5, the screw rod 111 and the retaining bracket 112 are arranged within the fixed rail 11. The screw rod 111 is a male screw extending in the longitudinal direction of the fixed rail 11. The retaining bracket 112 retains the screw rod 111.

The retaining bracket 112 of the present embodiment retains an extending-direction first end (a front end, in the present embodiment) of the screw rod 111. An extending-direction second end of the screw rod 111 is retained by a not-shown retaining bracket.

The nut portion 123 shown in FIG. 4 is retained by the movable rail 12. As shown in FIG. 6, the nut portion 123 comprises a nut 123A having a female thread to be engaged with the screw rod 111. The nut 123A rotates by receiving a rotational force from an electric motor (not shown).

The screw rod 111 is unrotatably retained in the fixed rail 11 via the retaining bracket 112. Thus, when the nut 123A rotates, the movable rail 12, that is, the seat body 2, moves with respect to the fixed rail 11.

<Shutter Mechanism>

A shutter mechanism is a mechanism for inhibiting a state in which the inside of the fixed rail 11 (especially, the screw rod 111) is visible through the opening 11A. As shown in FIG. 2, the shutter mechanism comprises the first shutter portion 20 and the second shutter portion 21.

The first shutter portion 20 closes part of the opening 11A located in a first longitudinal end (a front end, in the present embodiment) of the fixed rail 11. The second shutter portion 21 closes part of the opening 11A located in a second longitudinal end (a rear end, in the present embodiment) of the fixed rail 11.

In such a configuration, the state in which the inside of the fixed rail 11 is visible is inhibited. Part of the opening 11A between the first shutter portion 20 and the second shutter portion 21 is closed by the movable rail 12. Thus, the opening 11A is closed throughout in a longitudinal direction thereof.

2.2 Shutter Mechanism

<Overview of Shutter Mechanism>

The first shutter portion 20 and the second shutter portion 21 have the same structure. In an explanation below, the first shutter portion 20 will be described. As shown in FIG. 4, the first shutter portion 20 comprises at least an inner closure member 22 and an outer closure member 23.

As shown in FIG. 2, the inner closure member 22 and the outer closure member 23 close, in cooperation with each other, part of the opening 11A located in the first longitudinal end of the fixed rail 11. The inner closure member 22 and the outer closure member 23 receive a pressing force or a pulling force from the movable rail 12 to thereby slide with respect to the fixed rail 11 in conjunction with sliding of the movable rail 12.

Specifically, when the movable rail 12 slides toward a seat front side (hereinafter simply referred to as a front side), at least one of the inner closure member 22 or the outer closure member 23 slides toward the front side. When the movable rail 12 slides toward a seat rear side (hereinafter simply referred to as a rear side), at least one of the inner closure member 22 or the outer closure member 23 slides toward the rear side.

<Overview of Inner Closure Member>

Figure 7:
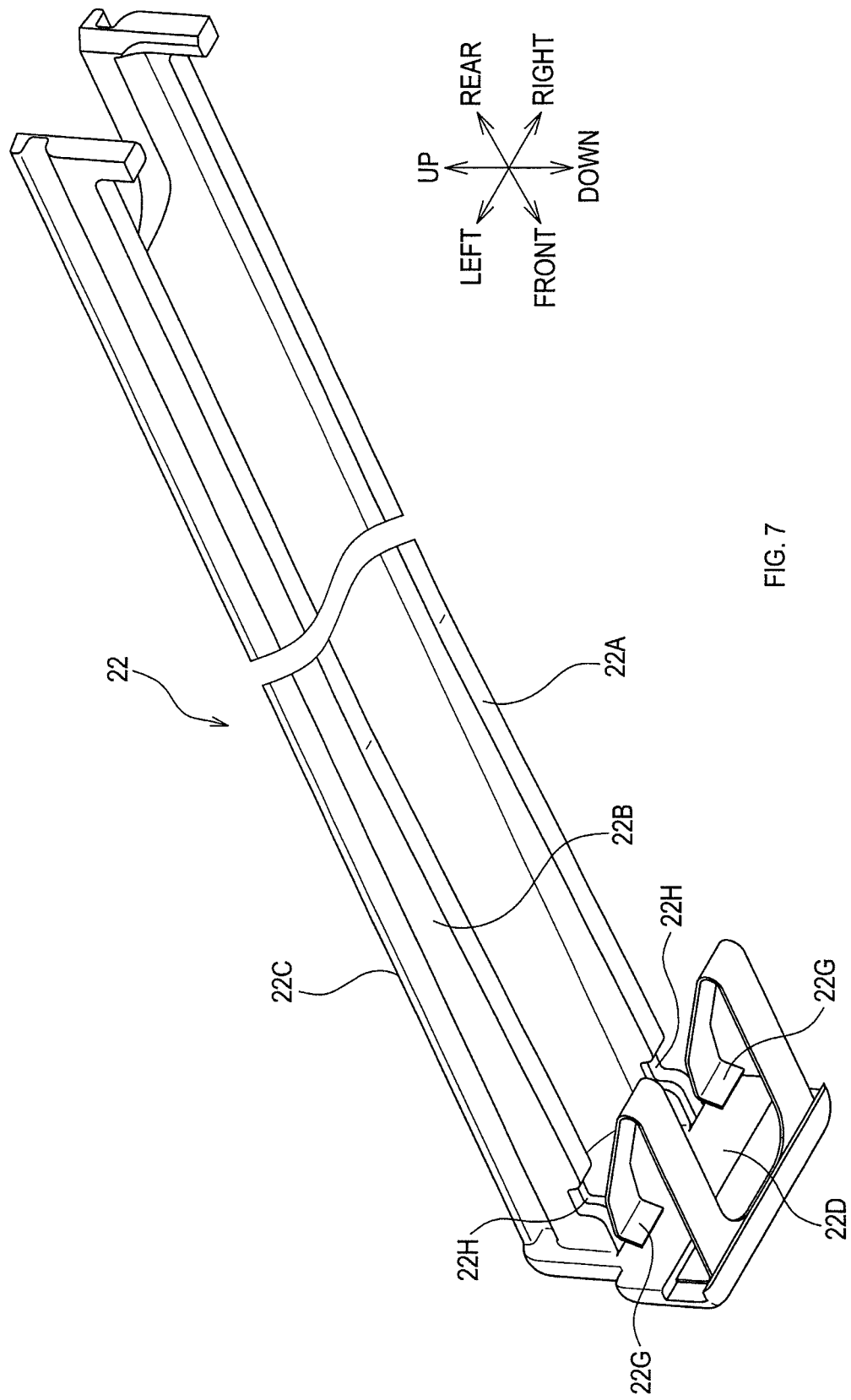
FIG. 7 is a diagram showing an inner closure member according to the embodiment.
Figure 8:
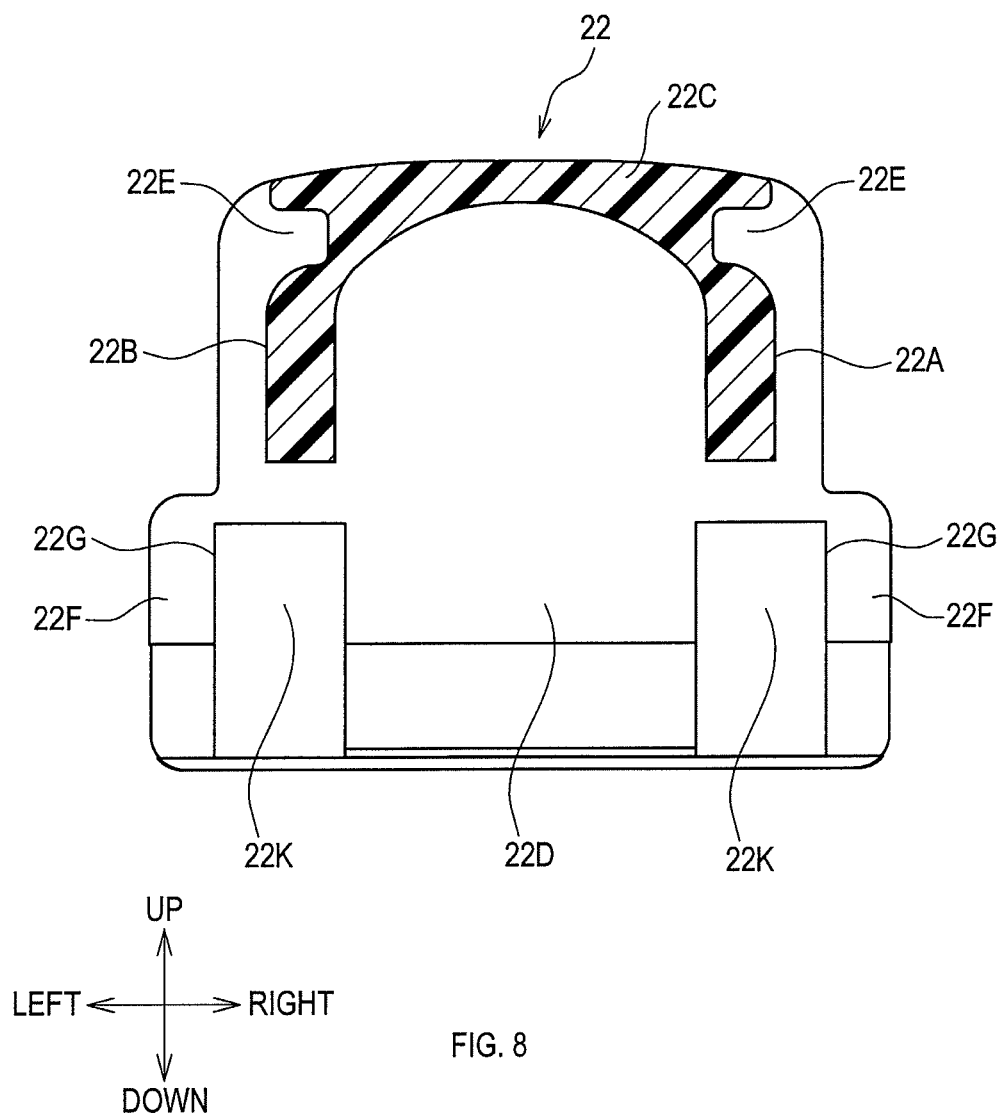
FIG. 8 is a diagram showing the inner closure member according to the embodiment.

As shown in FIGS. 7 and 8, a cross-section of the inner closure member 22 orthogonal to a sliding direction thereof has a substantially U-shape with its lower side opened. This allows the inner closure member 22 to cover the screw rod 111 from above.

Specifically, the inner closure member 22 comprises at least a first wall (right wall) 22A, a second wall (left wall) 22B, and a top plate 22C. The first wall 22A and the second wall 22B extend parallel to the longitudinal direction of the fixed rail 11 in a state facing each other in substantially horizontal directions. The top plate 22C couples an upper end of the first wall 22A and an upper end of the second wall 22B.

An extending-direction first end (a front end, in the present embodiment) of the inner closure member 22 is closed by an end wall 22D (see FIG. 7). The first wall 22A, the second wall 22B, the top plate 22C, and the end wall 22D are preferably integrally molded from resin.

<Overview of Outer Closure Member>

Figure 9:
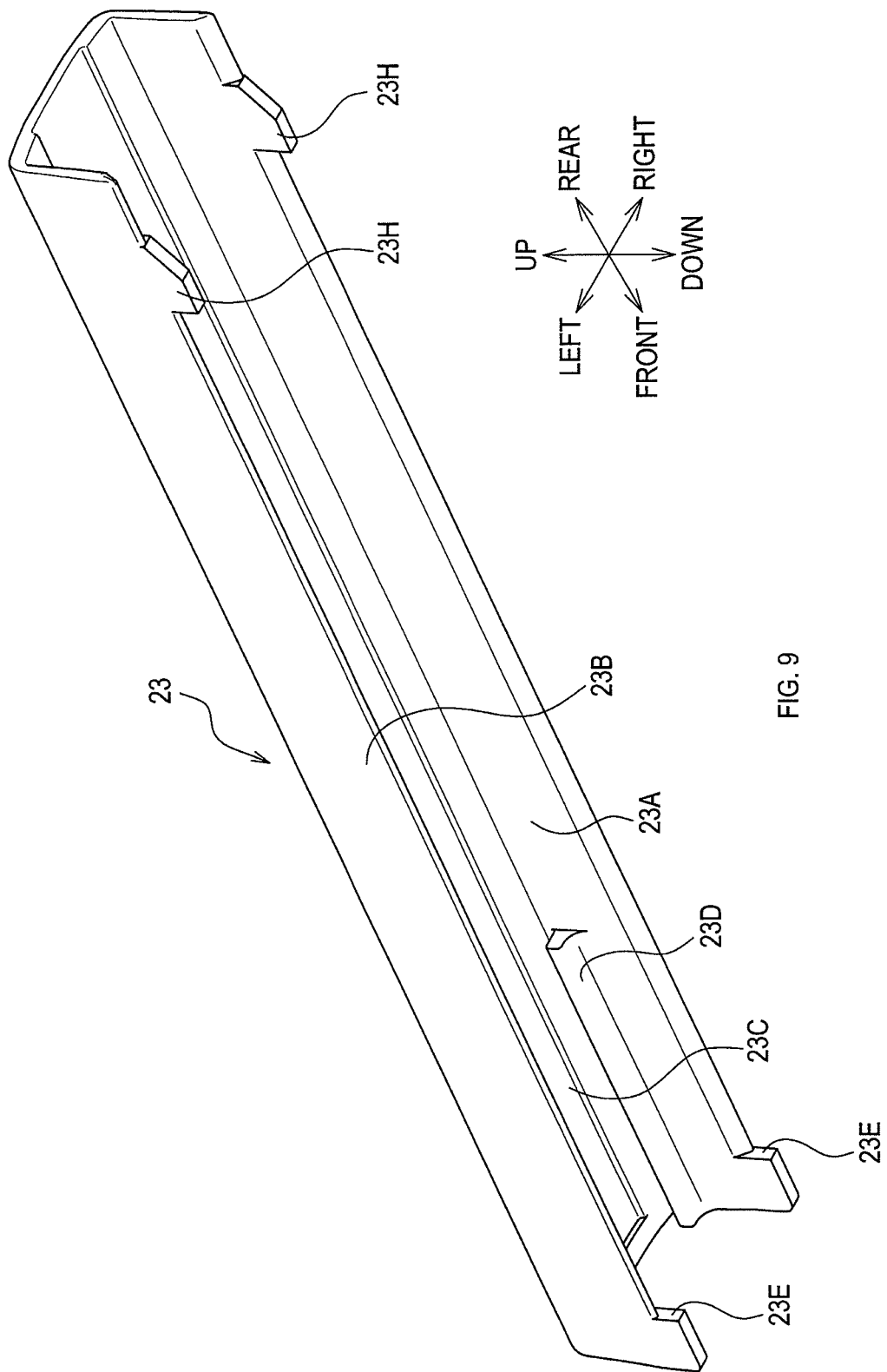
FIG. 9 is a diagram showing an outer closure member according to the embodiment.
Figure 10:
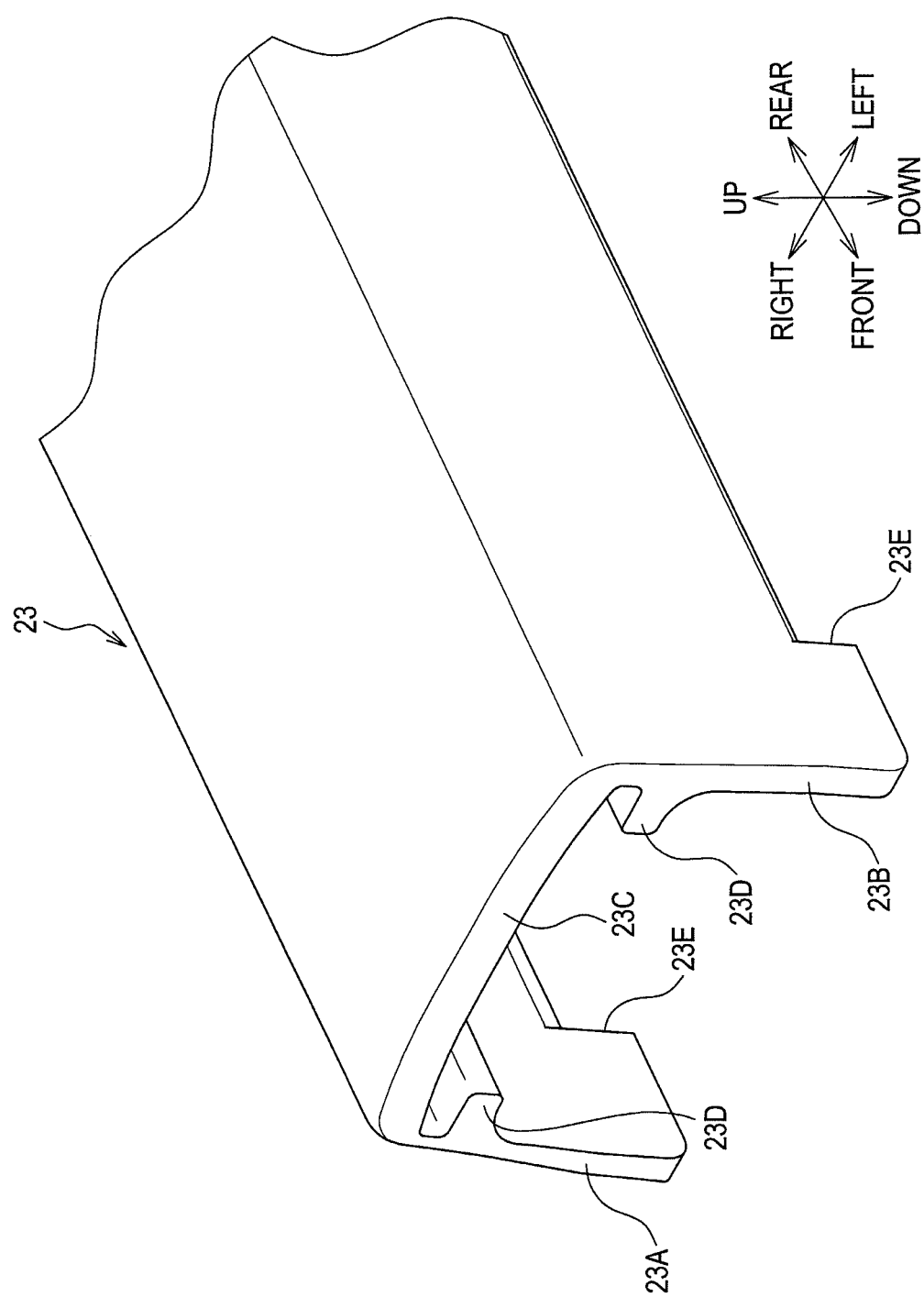
FIG. 10 is a diagram showing the outer closure member according to the embodiment.

As shown in FIGS. 9 and 10, a cross-section of the outer closure member 23 orthogonal to a sliding direction thereof has a substantially U-shape with its lower side opened. This allows the outer closure member 23 to cover the screw rod 111 from above.

Specifically, the outer closure member 23 comprises at least a first wall 23A, a second wall 23B, and a top plate 23C. The first wall 23A and the second wall 23B extend parallel to the longitudinal direction of the fixed rail 11 in a state facing each other in substantially horizontal directions. The top plate 23C couples an upper end of the first wall 23A and an upper end of the second wall 23B.

Figure 11:
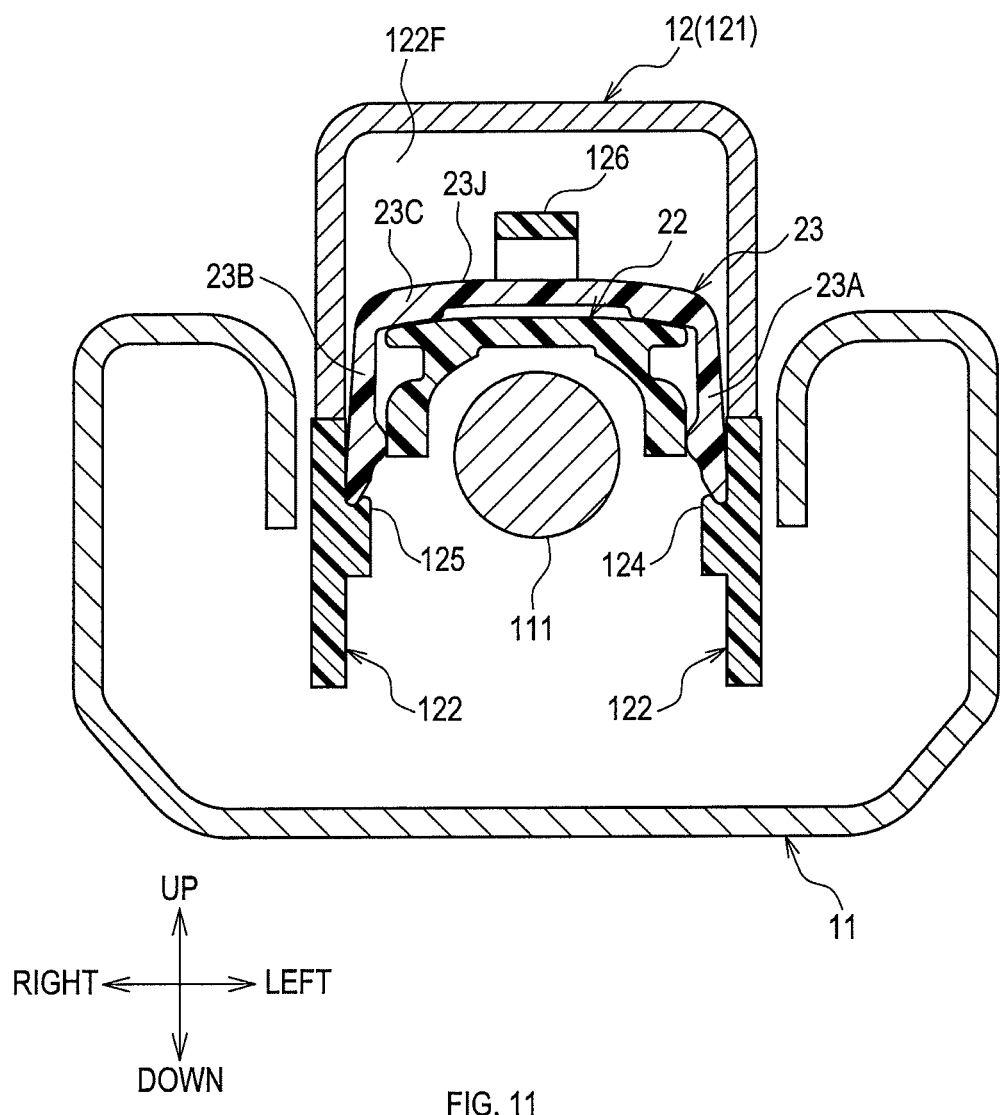
FIG. 11 is a diagram showing a cross-sectional configuration of the sliding device according to the embodiment.

As shown in FIG. 11, the outer closure member 23 is slidable while in sliding contact with an outside wall surface of the inner closure member 22. In other words, the inner closure member 22 is slidable while in sliding contact with inside wall surfaces of the outer closure member 23.

Figure 12:
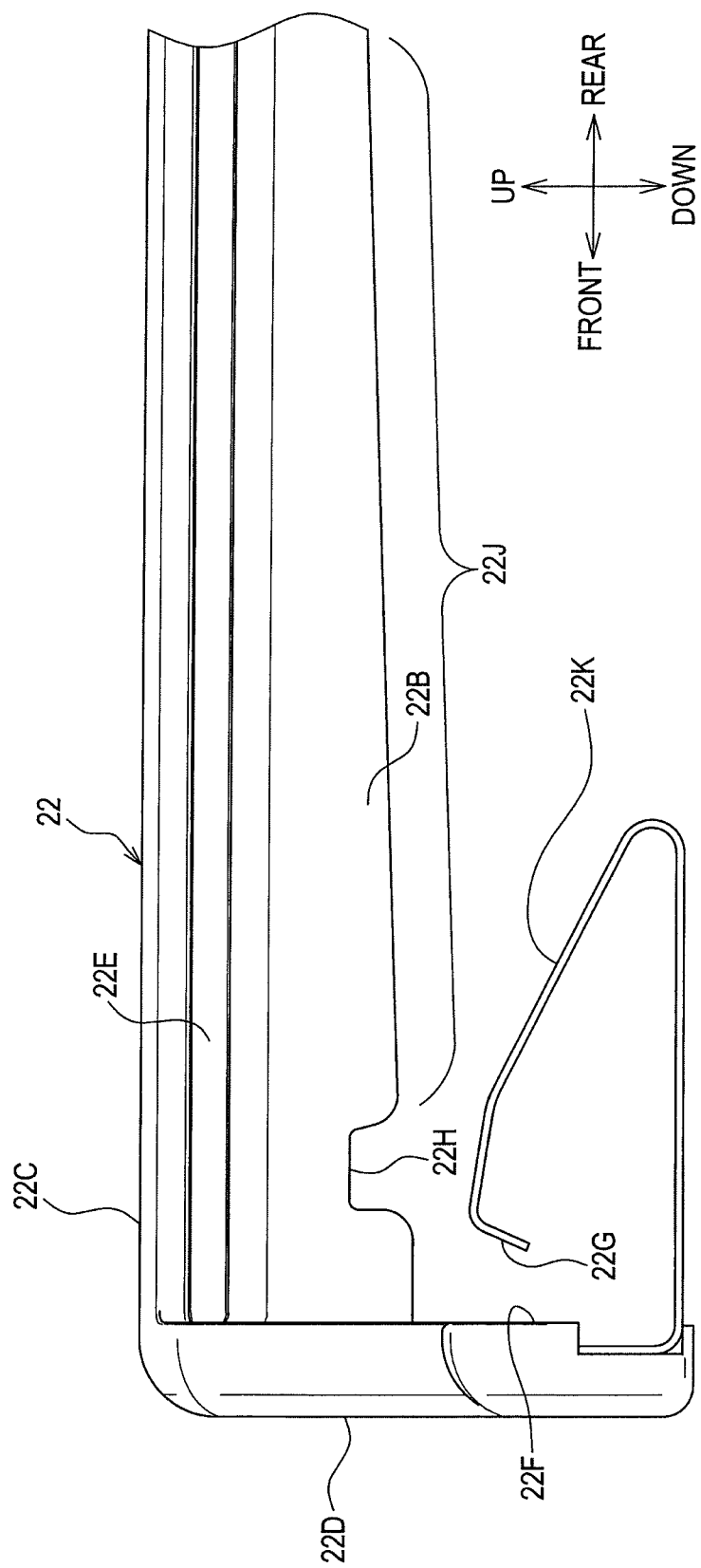
FIG. 12 is a diagram showing the inner closure member according to the embodiment.

As shown in FIGS. 8 and 12, the first wall 22A and the second wall 22B of the inner closure member 22 each comprise a groove 22E provided on an outside wall surface thereof. Each groove 22E extends parallel to the sliding direction.

As shown in FIG. 10, the first wall 23A and the second wall 23B of the outer closure member 23 each comprise a ridge 23D provided on their inside wall surfaces. As shown in FIG. 9, each ridge 23D extends parallel to the sliding direction from an extending-direction first end (a front end, in the present embodiment) of the outer closure member 23.

Each ridge 23D can be in sliding contact with the corresponding groove 22E while being fitted into the groove 22E. That is, each ridge 23D and the corresponding groove 22E function as a guide for guiding a relative displacement of the outer closure member 23 with respect to the inner closure member 22.

The outer closure member 23 is slidably supported by the end cap 122.

Figure 14:
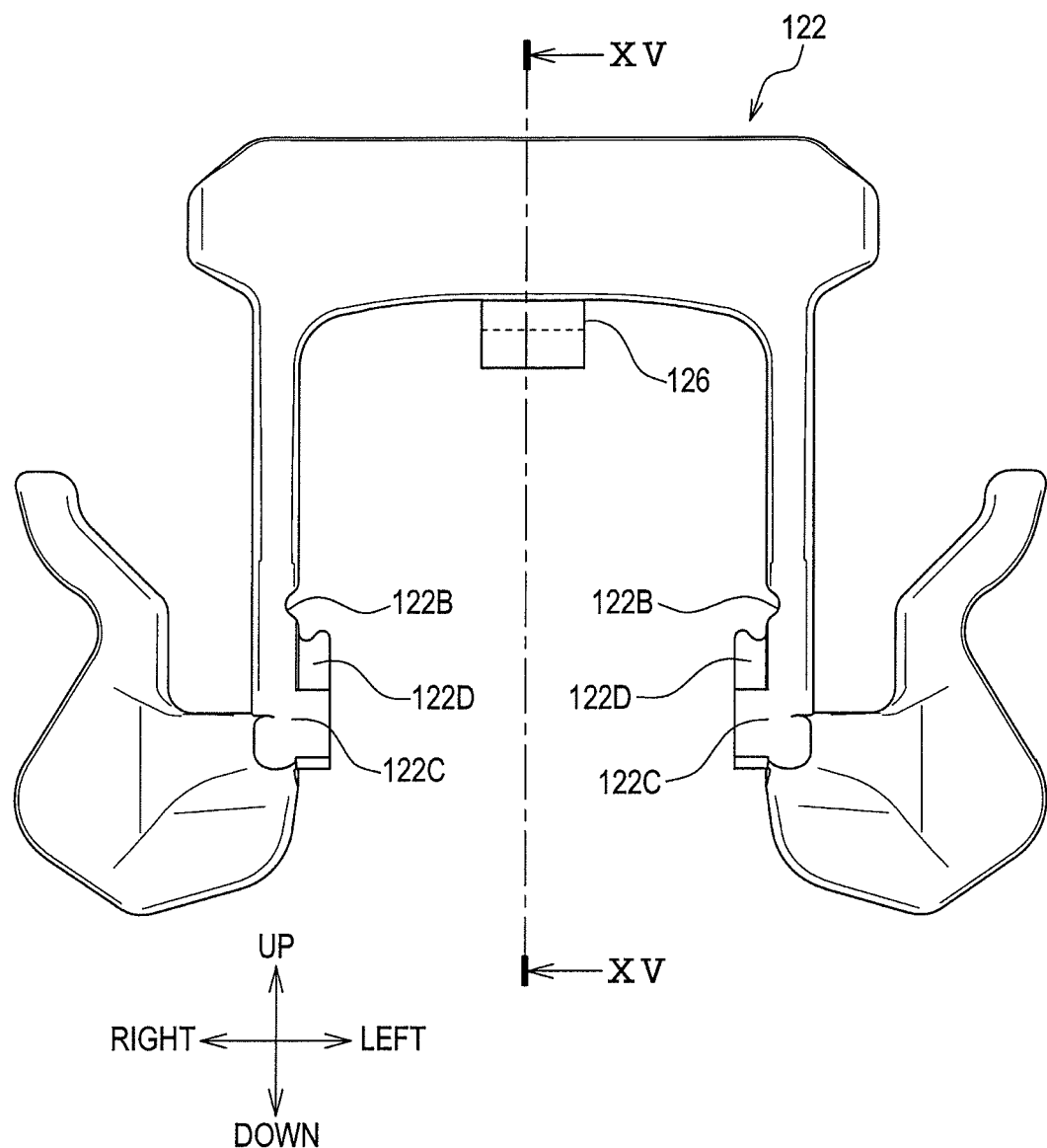
FIG. 14 is a front view of the end cap according to the embodiment.

As shown in FIG. 14, the end cap 122 comprises a guide 122B. The guide 122B is in sliding contact with each of the first wall 23A and the second wall 23B of the outer closure member 23 to thereby guide sliding of the outer closure member 23.

2.3 Detailed Structure of Shutter Mechanism

<Configuration to Cause Inner Closure Member and Outer Closure Member to Make Forward Movement>

"Forward movement" as in the present embodiment refers to sliding of the inner closure member 22 and the outer closure member 23 by receiving a pressing force from the movable rail 12. "Backward movement" refers to sliding in a direction opposite to that of such "forward movement".

In the first shutter portion 20, when the movable rail 12 slides in a direction from the rear side toward the front side, a pressing force acts on the first shutter portion 20. Specifically, when the movable rail 12 slides toward the front side, the movable rail 12 applies the pressing force to at least one of the inner closure member 22 or the outer closure member 23.

In the second shutter portion 21, when the movable rail 12 slides in a direction from the front side toward the rear side, a pressing force (from the rear end of the movable rail 12) acts on the second shutter portion 21. Specifically, when the pressing force is directed toward the rear side, "forward movement" refers to sliding of the inner closure member 22 and the outer closure member 23 toward the rear side.

In the movable rail 12 of the present embodiment, the (front) end cap 122 is attached to the first longitudinal end (a front end, in the present embodiment) of the rail body 121. Thus, the inner closure member 22 and the outer closure member 23 receive a pressing force upon contact with the end cap 122.

Figure 15:
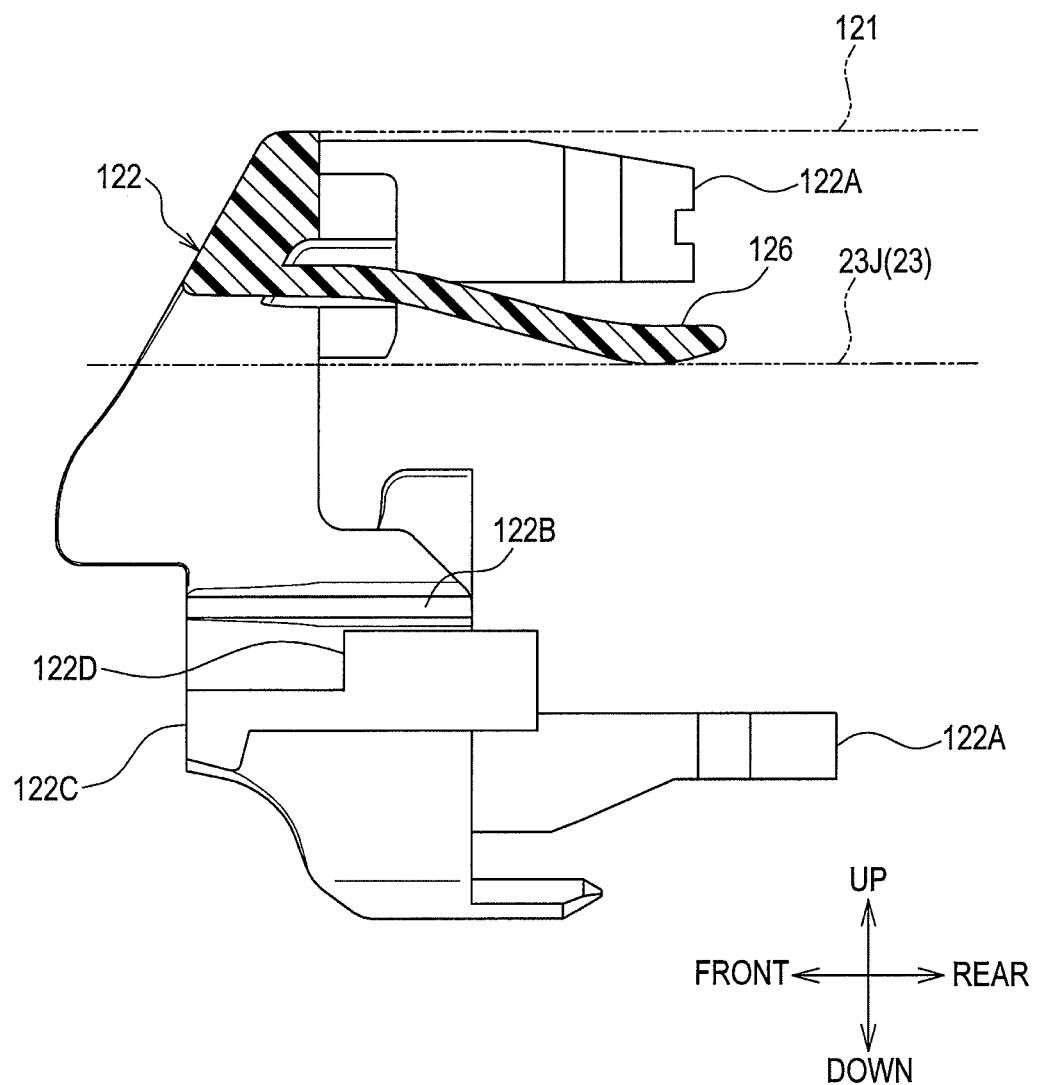
FIG. 15 is a sectional view taken along line XV-XV in FIG. 14.
Figure 19:
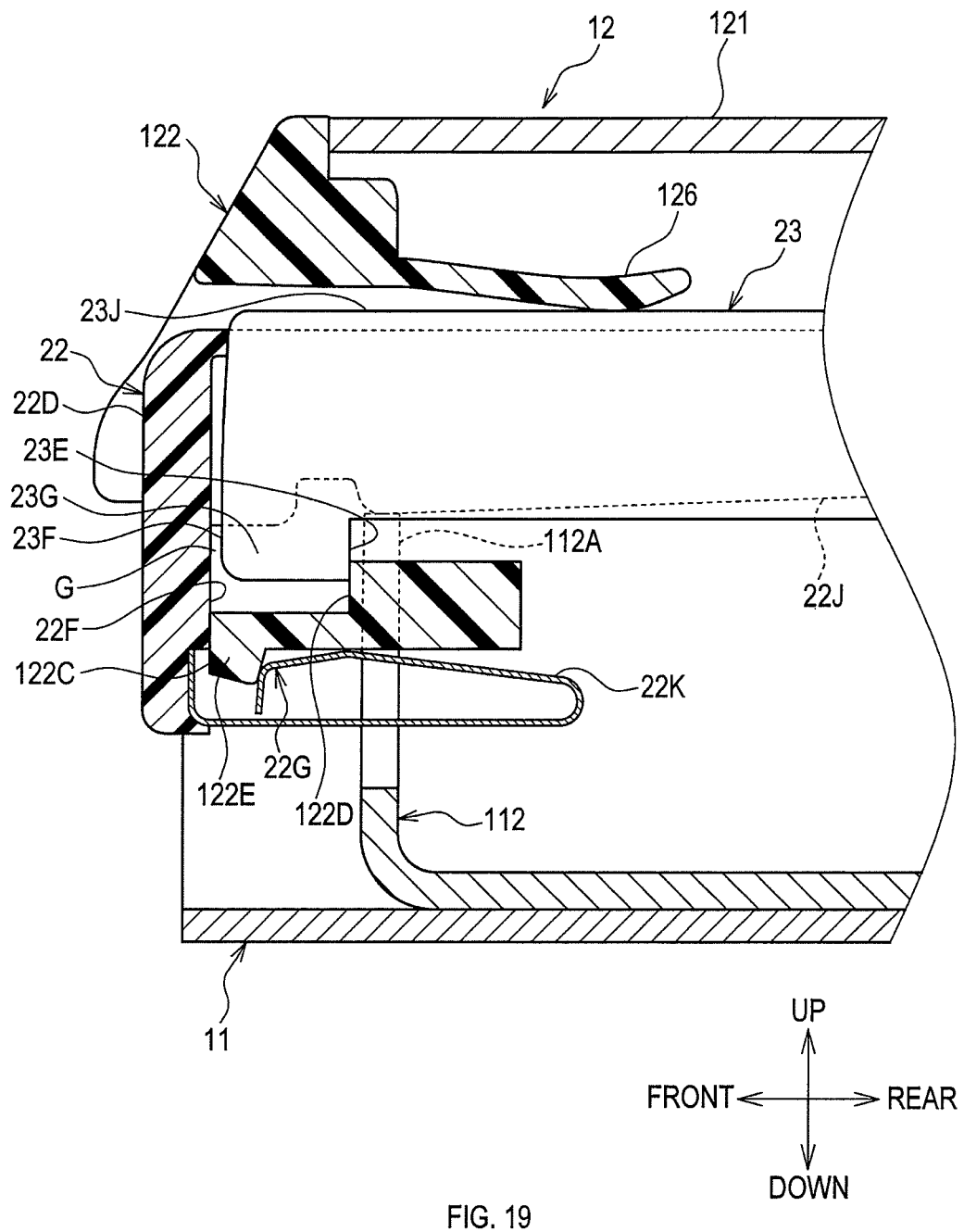
FIG. 19 is a diagram for explaining operation of the sliding device according to the embodiment.

Specifically, as shown in FIGS. 14 and 15, the end cap 122 comprises a first pressing portion 122C and a second pressing portion 122D. The inner closure member 22 comprises a first pressed portion 22F (see FIG. 8 and FIG. 19). In FIG. 19, the first pressed portion 22F is pressed by the first pressing portion 122C. The outer closure member 23 comprises a second pressed portion 23E (see FIG. 9 and FIG. 19). In FIG. 19, the second pressed portion 22E is pressed by the second pressing portion 122D.

As shown in FIG. 19, when the first pressing portion 122C (moving forward) comes in contact with the first pressed portion 22F, that is, when the movable rail 12 comes in contact with the first pressed portion 22F, the inner closure member 22 directly receives a pressing force from the movable rail 12 to thereby slide forward.

Figure 16:
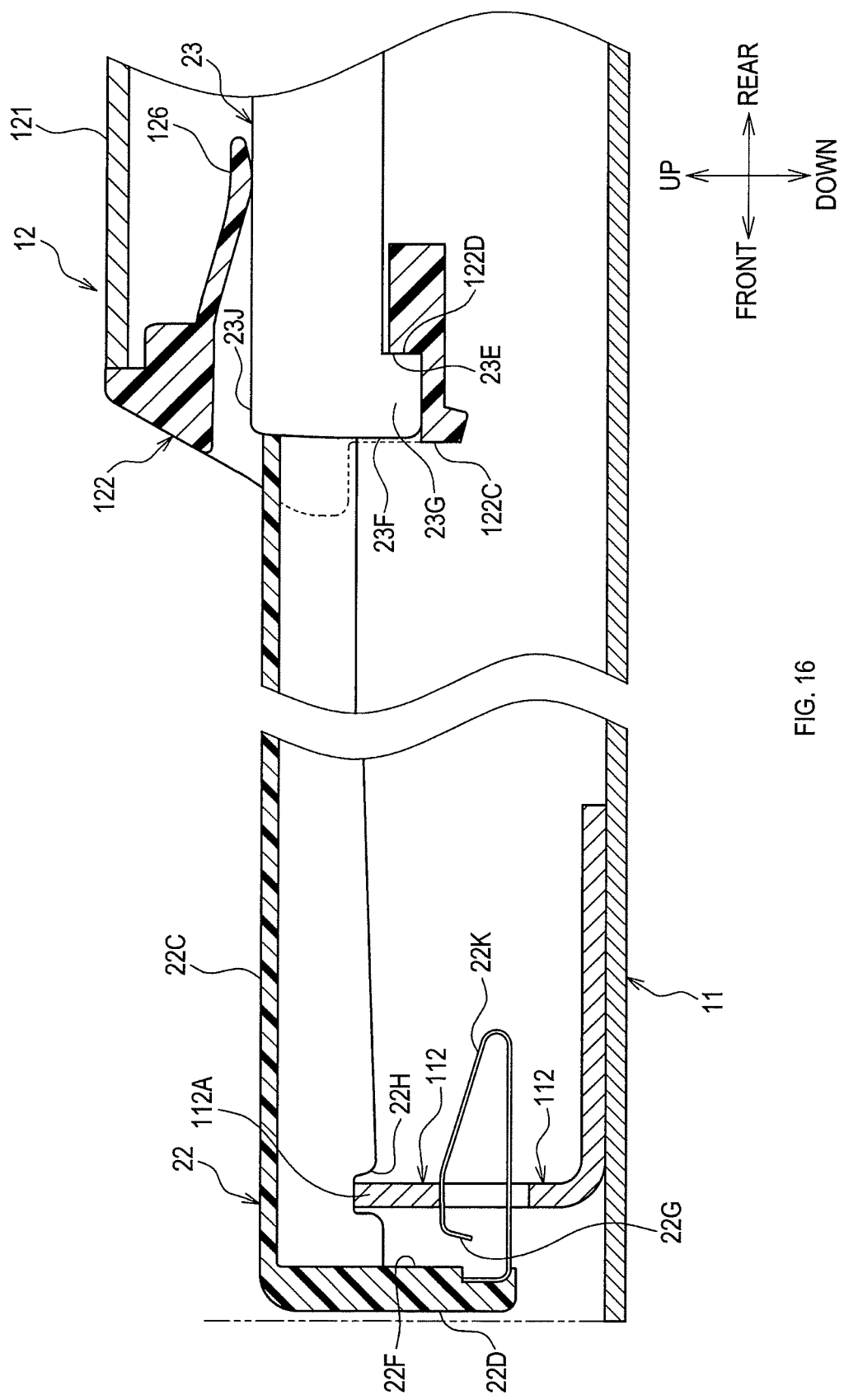
FIG. 16 is a diagram for explaining operation of the sliding device according to the embodiment.

As shown in FIG. 16, when the second pressing portion 122D (of the end cap 122) moves forward and comes in contact with the second pressed portion 23E (of the outer closure member 23), that is, when the movable rail 12 comes in contact with the second pressed portion 23E, the outer closure member 23 directly receives a pressing force from the movable rail 12 to thereby slide.

Specifically, when the movable rail 12 moves forward, the second pressing portion 122D (of the end cap 122) first comes in contact with the second pressed portion 23E of the outer closure member 23 (see FIG. 16). This causes the outer closure member 23 to make a forward movement together with the movable rail 12 while receiving the pressing force from the movable rail 12, as shown in FIGS. 16 and 17 in this order.

Figure 17:
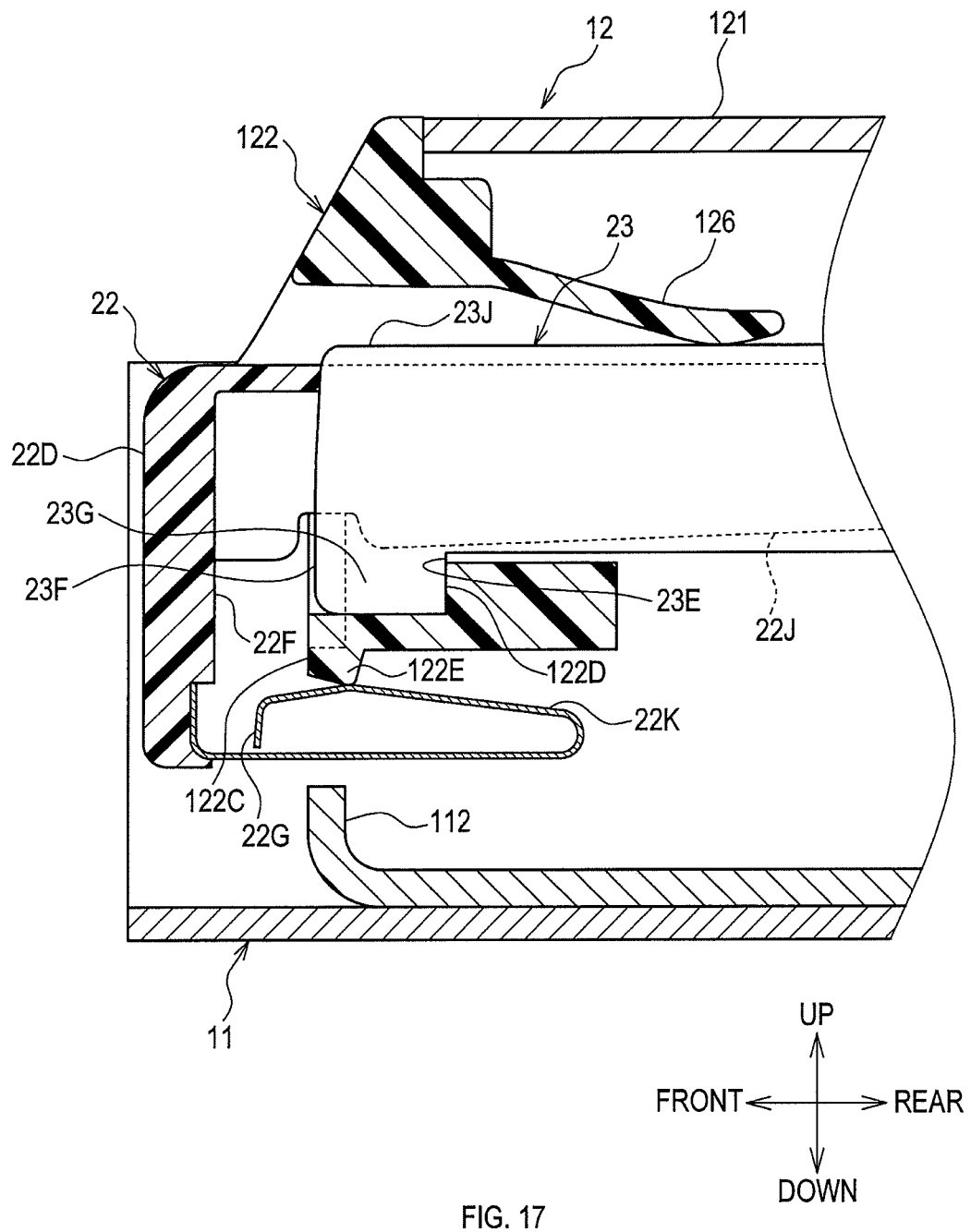
FIG. 17 is a diagram for explaining operation of the sliding device according to the embodiment.
Figure 18:
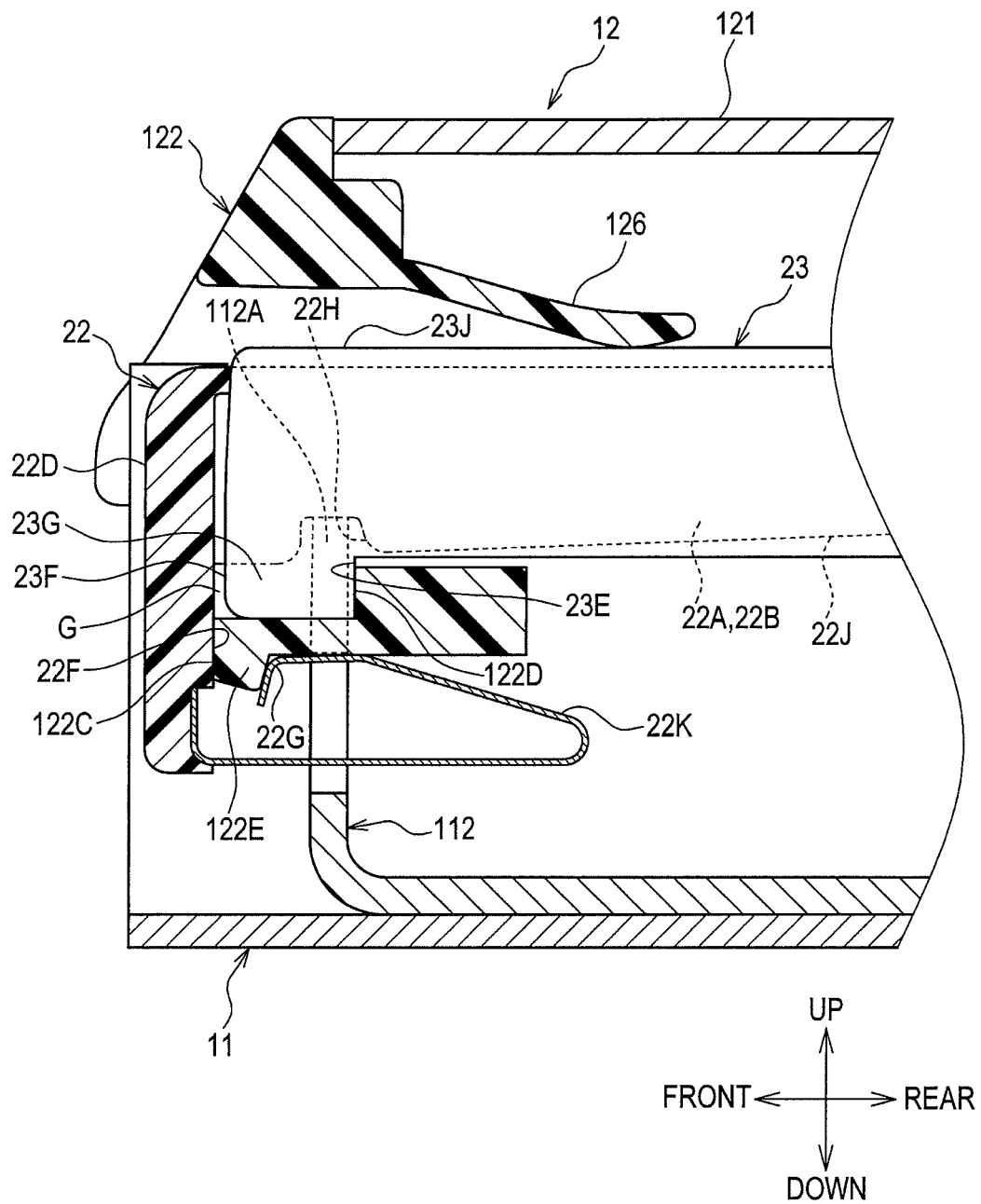
FIG. 18 is a diagram for explaining operation of the sliding device according to the embodiment.

When the movable rail 12 further moves forward from the state shown in FIG. 17, the first pressing portion 122C comes in contact with the first pressed portion 22F of the inner closure member 22 as shown in FIG. 18. Even in the state where the first pressing portion 122C is in contact with the first pressed portion 22F, a gap G is present between a front end 23F of the outer closure member 23 and the end wall 22D of the inner closure member 22.

That is, the outer closure member 23 makes a forward movement by directly receiving a pressing force from the movable rail 12, and the inner closure member 22 makes a forward movement by directly receiving the pressing force from the first pressing portion 122C (without receiving the pressing force via the outer closure member 23).

When the movable rail 12 further moves forward while applying the pressing force to the first pressed portion 22F AND the second pressed portion 23E (shown by the change from FIG. 18 to FIG. 19), the inner closure member 22 and the outer closure member 23 make a forward movement together with the movable rail 12 while housed in the movable rail 12 as shown in FIG. 3.

In a state (see FIG. 2) where the movable rail 12 slides rearward and where the inner closure member 22 and the outer closure member 23 (of the first shutter portion 20) are housed in the fixed rail 11 (and are not inside the movable rail 12), the first pressed portion 22F and the second pressed portion 23E are positioned within the fixed rail 11 as shown in FIG. 16.

That is, the inner closure member 22 and the outer closure member 23 are slidable between a position housed in the fixed rail 11 (and outside of the movable rail 12, see FIG. 2) and a position protruding from the fixed rail 11 together with (and inside of) the movable rail 12 (see FIG. 3).

As shown in FIG. 19, the first pressed portion 22F of the present embodiment is provided to a forward-movement-direction end of the inner closure member 22. Specifically, the first pressed portion 22F is provided to the end wall 22D of the inner closure member 22.

As shown in FIG. 9, the second pressed portions 23E of the present embodiment are provided to a forward-movement-direction end of the outer closure member 23. Specifically, each of the second pressed portions 23E is provided to an extending-direction first end of a lower end of the corresponding one of the first wall 23A and the second wall 23B of the outer closure member 23, and extends down from the corresponding one of the first wall 23A and the second wall 23B.

Thus, when the inner closure member 22 slides by receiving a pressing force from the movable rail 12, the inner closure member 22 as a whole slides in such a manner as to be pulled by the extending-direction first end of the inner closure member 22.

Similarly, when the outer closure member 23 slides by receiving a pressing force from the movable rail 12, the outer closure member 23 as a whole slides in such a manner as to be pulled by the extending-direction first end of the outer closure member 23.

<Configuration to Cause Inner Closure Member and Outer Closure Member to Make Backward Movement>

As shown in FIG. 18, the inner closure member 22 comprises a first engaging portion 22G. The movable rail 12 (the end cap 122, in the present embodiment) comprises a first engaged portion 122E that is caught by and engaged with the first engaging portion 22G in a disengageable manner.

The first engaging portion 22G is elastically displaceable. Specifically, the first engaging portion 22G is an elastically displaceable portion formed by a bent metal strip member (a flat spring). The flat spring constituting the first engaging portion 22G is fitted to the end wall 22D.

A slope 22K is provided to an end of the flat spring located rearward of the first engaging portion 22G. The slope 22K is designed to make the first engaging portion 22G displaced when the first engaged portion 122E moves forward while in sliding contact with the slope 22K.

When the first engaged portion 122E is in engagement with the first engaging portion 22G, the first engaged portion 122E is positioned closer to the forward-movement-direction end than the first engaging portion 22G. Thus, when the movable rail 12 moves rearward, the inner closure member 22 receives a retreating force (a pulling force) via the first engaged portion 122E and the top plate 22C. See FIG. 17 relative to FIG. 18, as the outer closure member 23 moves rearward, the first engaged portion 122E slowly disengages from the first engaging portion 22G.

As shown in FIGS. 7 and 12, the inner closure member 22 comprises a second engaging portion 22H. As shown in FIG. 16, the fixed rail 11 comprises a second engaged portion 112A that is caught by and engaged with the second engaging portion 22H in a disengageable manner. The second engaged portion 112A is provided to an upper end of the retaining bracket 112.

As shown in FIGS. 7 and 12, the second engaging portion 22H is formed by a concave portion recessed upward from a lower end of each of the first wall 22A and the second wall 22B. In the lower end of each of the first wall 22A and the second wall 22B, an inclined portion 22J is provided to a part located rearward of the second engaging portion 22H.

The inclined portion 22J is inclined with respect to an upper face of the top plate 22C such that a dimension between the top plate 22C and the lower end becomes smaller toward a backward-movement-direction end. The inclined portion 22J is provided in a range of approximately ⅓ of a longitudinal dimension of the inner closure member 22.

The first engaging portion 22G in the non-engagement state (see FIG. 16) is positioned closer to the second engaging portion 22H than the first engaging portion 22G in the engagement state (see FIG. 19). In other words, the first engaging portion 22G in the non-engagement state is positioned more upward than the first engaging portion 22G in the engagement state.

As shown in FIG. 16, when the first engaging portion 22G is in the non-engagement state and also when the second engaging portion 22H is in engagement with the second engaged portion 112A, the first engaging portion 22G, that is, the flat spring constituting the first engaging portion 22G, is in contact with the retaining bracket 112.

Thus, the first engaging portion 22G in the state shown in FIG. 16 presses the retaining bracket 112 upward.

Furthermore, the first engaging portion 22G in the non-engagement state applies an elastic force for maintaining the engagement state of the second engaging portion 22H to the second engaging portion 22H or to the second engaged portion 112A. That is, the elastic force generated by the first engaging portion 22G in the non-engagement state acts on the inner closure member 22 as a force to press the retaining bracket 112 against the second engaging portion 22H, which is a concave portion.

As shown in FIG. 19, when the first engaging portion 22G is in engagement with the first engaged portion 122E, a portion 23G to which the second pressed portion 23E is provided is held between the end cap 122 (the movable rail 12) and the inner closure member 22 (the end wall 22D) in the sliding directions.

Thus, when the movable rail 12 is protruding from the fixed rail 11 and also when the movable rail 12 slides rearward, the outer closure member 23 is pressed by the inner closure member 22 (the end wall 22D) to thereby slide in a backward movement direction.

<Sliding Operation of Inner Closure Member and Outer Closure Member>

As shown in FIGS. 16, 17, 18, and 19 in this order, when the movable rail 12 moves forward, the engagement state of the second engaging portion 22H is released after the first engaging portion 22G has entered the engagement state. In this state, the inner closure member 22 and the outer closure member 23 are housed in the movable rail 12.

Specifically, when the movable rail 12 moves forward and also before the second pressing portion 122D of the end cap 122 comes in contact with the second pressed portion 23E of the outer closure member 23, only the movable rail 12 moves forward.

In this state, the inner closure member 22 does not slide with respect to the fixed rail 11 because the second engaging portion 22H and the second engaged portion 112A are engaged with each other. The outer closure member 23 hardly slides due to a frictional force generated at a position thereof in contact with the inner closure member 22.

When the second pressing portion 122D comes in contact with the second pressed portion 23E, the outer closure member 23 and the movable rail 12 integrally make a forward movement with the outer closure member 23 housed in the movable rail 12.

When the movable rail 12 moves forward with the first engaged portion 122E in sliding contact with the slope 22K, the first engaging portion 22G is displaced (see FIG. 17), and then engagement of the first engaging portion 22G with the first engaged portion 122E is established (see FIG. 18).

When the movable rail 12 further moves forward, the inner closure member 22 and the outer closure member 23 integrally make a forward movement together with the movable rail 12 with the movable rail 12 in contact with the first pressed portion 22F and the second pressed portion 23E (see FIG. 3).

As shown in FIGS. 19, 18, and 17 in this order, when the movable rail 12 moves rearward, the engagement state of the first engaging portion 22G is released after the second engaging portion 22H has entered an engagement state. The inner closure member 22 and the outer closure member 23 make a backward movement integrally with the movable rail 12 until the second engaging portion 22H enters the engagement state, that is, until the engagement state of the first engaging portion 22G is released.

After the second engaged portion 112A is guided toward the second engaging portion 22H while in sliding contact with the inclined portion 22J, the second engaged portion 112A is engaged with the second engaging portion 22H (see FIG. 18). In the state where the movable rail 12 is housed in the fixed rail 11, the inner closure member 22 does not slide even when the movable rail 12 further moves rearward because the second engaging portion 22H is in the engagement state.

When the movable rail 12 further slides rearward while being housed in the fixed rail 11, only the movable rail 12 moves rearward until the movable rail 12 (the end cap 122) comes in contact with a locking protrusion 23H (see FIG. 9) of the outer closure member 23.

When the movable rail 12 further moves rearward with the end cap 122 in contact with the locking protrusion 23H, the outer closure member 23 is locked to the end cap 122 via the locking protrusion 23H. Thus, the outer closure member 23 and the movable rail 12 integrally make a backward movement (see FIG. 2).

<Relationships between End Cap, Outer Closure Member, etc.>

As shown in FIG. 19, the upper end of the movable rail 12, an upper end of the outer closure member 23, an upper end of the inner closure member 22, and the upper end of the retaining bracket 112 are vertically arranged in this order from above.

The resin forming the inner closure member 22 preferably has a hardness equivalent to that of the end cap 122. A resin forming the outer closure member 23 has a hardness less than that of the inner closure member 22. In the present embodiment, the end cap 122 and the inner closure member 22 are made of the same resin.

That is, the upper end of the outer closure member 23 and the upper end of the inner closure member 22 are designed to be arranged between the movable rail 12 and the retaining bracket 112, which have a hardness greater than that of the outer closure member 23 and the inner closure member 22.

As shown in FIG. 11, an upper surface 23J (hereinafter referred to as an opposed surface 23J) of the top plate 23C of the outer closure member 23 is spaced apart from an inside wall surface of the movable rail 12 (the end cap 122, in the present embodiment) via a clearance 122F.

The end cap 122 comprises first and second support portions 124 and 125 that support the outer closure member 23 in a slidable manner. The first support portion 124 supports the first wall 23A. The second support portion 125 supports the second wall 23B.

Figure 20:
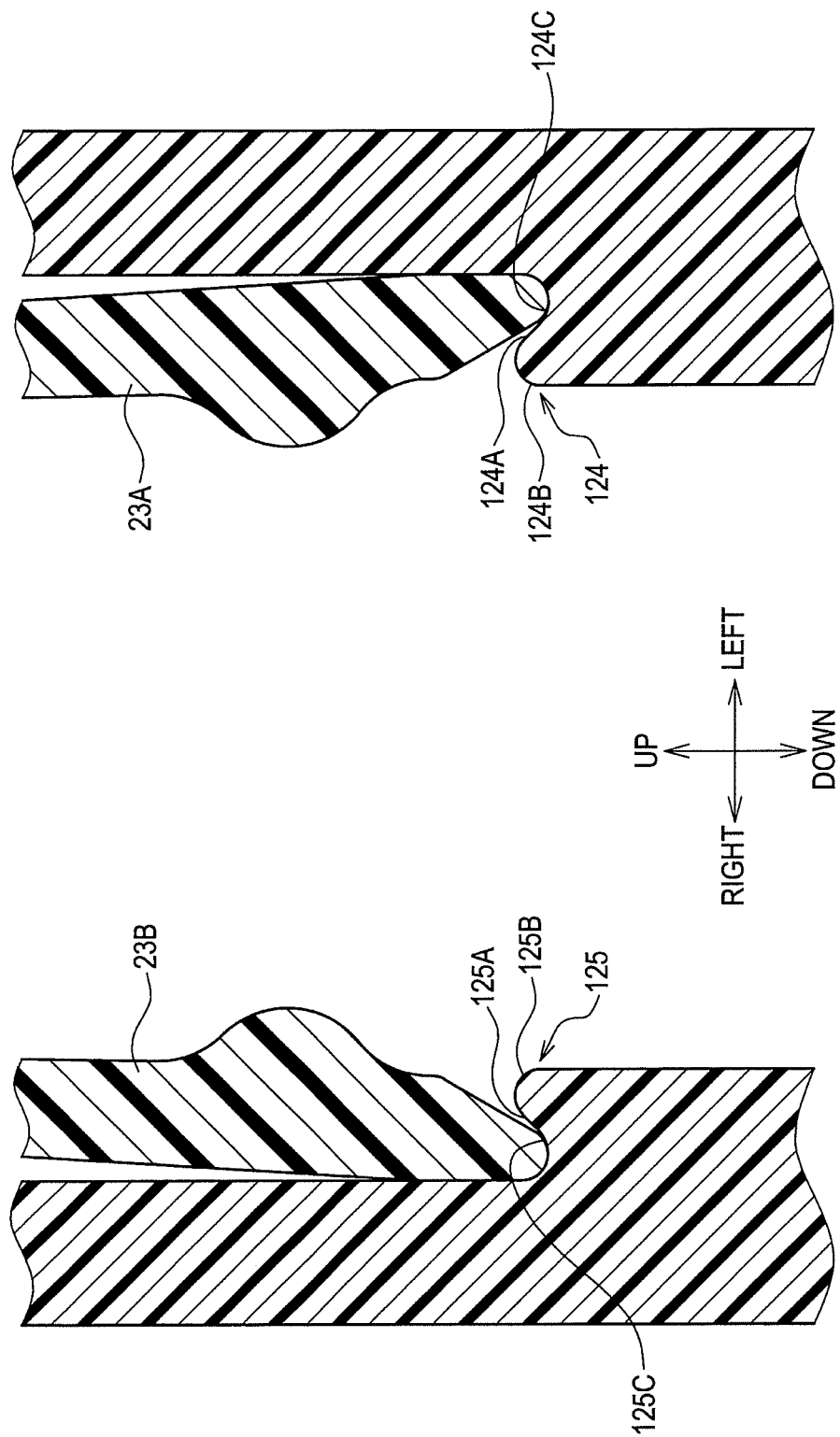
FIG. 20 is a diagram showing a first support portion and a second support portion of the sliding device according to the embodiment.

As shown in FIG. 20, the first support portion 124 comprises a first sliding-contact surface 124A. The second support portion 125 comprises a second sliding-contact surface 125A. The first sliding-contact surface 124A is in sliding contact with a lower end of the first wall 23A. The second sliding-contact surface 125A is in sliding contact with a lower end of the second wall 23B.

The first sliding-contact surface 124A and the second sliding-contact surface 125A are inclined with respect to a horizontal direction. Specifically, the first sliding-contact surface 124A is inclined such that a first end 124B is higher than a second end 124C. The first end 124B is an end of the first sliding-contact surface 124A closer to the second wall 23B. The second end 124C is an end of the first sliding-contact surface 124A closer to the first wall 23A.

The second sliding-contact surface 125A is inclined such that a third end 125B is higher than a fourth end 125C. The third end 125B is an end of the second sliding-contact surface 125A closer to the first wall 23A. The fourth end 125C is an end of the second sliding-contact surface 125A closer to the second wall 23B.

The lower end of the first wall 23A and the lower end of the second wall 23B are supported by the first support portion 124 and the second support portion 125, respectively, in a state elastically displaced in mutually approaching directions. In other words, the first wall 23A and the second wall 23B are fitted to the end cap 122 in a flexurally deformed state.

Specifically, a distance between the lower end of the first wall 23A and the lower end of the second wall 23B in a state where the outer closure member 23 is removed from the end cap 122 is greater than that in the state where the outer closure member 23 is fitted to the end cap 122.

As shown in FIG. 15, the end cap 122 comprises an elastic portion 126. The elastic portion 126 exerts an elastic force oriented in a direction to space the opposed surface 23J apart from the movable rail 12. The elastic portion 126 is shaped like a flat spring extending from the end cap 122 into the rail body 121.

Thus, in the state where the end cap 122 is attached to the rail body 121, the elastic portion 126 is housed in the rail body 121. The end cap 122 and the elastic portion 126 are integrally molded from resin.

3. Characteristics of Vehicle Seat (Sliding Device, in Particular) of the Present Embodiment 3.1 Characteristics of Configuration to Cause Inner Closure Member and Outer Closure Member to Make Forward Movement Upon contact of the movable rail 12 with the first pressed portion 22F, the inner closure member 22 directly receives a pressing force from the movable rail 12 to thereby slide. Similarly, upon contact of the movable rail 12 with the second pressed portion 23E, the outer closure member 23 directly receives a pressing force from the movable rail 12 to thereby slide.

That is, the inner closure member 22 and the outer closure member 23 can reliably slide because the inner closure member 22 and the outer closure member 23 both slide by receiving the pressing force from the movable rail 12.

The first pressed portion 22F and the second pressed portion 23E contact the first pressing portion 122C and the second pressing portion 122D of the end cap 122, respectively. This enables the first pressing portion 122C and the second pressing portion 122D to be formed easily.

Specifically, since formability in resin forming is higher than that in metal forming, the first pressing portion 122C and the second pressing portion 122D can be easily formed as compared with a case in which the first pressing portion 122C and the second pressing portion 122D are provided to the rail body 121 of metal.

The inner closure member 22 and the outer closure member 23 are slidable between a position housed in the fixed rail 11 and a position protruding from the fixed rail 11 together with the movable rail 12. This enables size reduction of the sliding device as compared with a case in which the inner closure member 22 and the outer closure member 23 are always positioned outside of the fixed rail 11 because the inner closure member 22 and the outer closure member 23 are housed in the fixed rail 11.

The first pressed portion 22F is provided to the forward-movement-direction end of the inner closure member 22, and the second pressed portion 23E is provided to the forward-movement-direction end of the outer closure member 23. In such a configuration, the pressing force of the movable rail 12 acts on the inner closure member 22 and the outer closure member 23 as a pulling force to slide the inner closure member 22 and the outer closure member 23.

Accordingly, the inner closure member 22 and the outer closure member 23 slide in a stable manner as compared with a case in which the inner closure member 22 and the outer closure member 23 make a forward movement with the pressing force applied to a backward-movement-direction end of the inner closure member 22 and a backward-movement-direction end of the outer closure member 23.

The first pressed portion 22F and the second pressed portion 23E are positioned within the fixed rail 11 when the inner closure member 22 and the outer closure member 23 are in the state housed in the fixed rail 11. In such a configuration, the first pressed portion 22F and the second pressed portion 23E are covered and protected by the fixed rail 11, thus inhibiting the first pressed portion 22F and the second pressed portion 23E from being damaged.

3.2 Characteristics of Configuration to Cause Inner Closure Member and Outer Closure Member to Make Backward Movement When the movable rail 12 is positioned within the fixed rail 11, a position of the inner closure member 22 is maintained by engagement of the second engaged portion 112A with the second engaging portion 22H. When part of the movable rail 12 is positioned outside of the fixed rail 11, the first engaged portion 122E and the first engaging portion 22G are engaged with each other and also the engagement of the second engaged portion 112A with the second engaging portion 22H is released, thereby enabling the inner closure member 22 to slide integrally with the movable rail 12. Accordingly, the inner closure member 22 can reliably slide together with the movable rail 12.

When the movable rail 12 moves forward, the engagement state of the second engaging portion 22H is released after the first engaging portion 22G has entered an engagement state. When the movable rail 12 slides rearward, the engagement state of the first engaging portion 22G is released after the second engaging portion 22H has entered the engagement state. This enables the inner closure member 22 to reliably slide integrally with the movable rail 12 when the movable rail 12 moves forward.

The first engaging portion 22G in the non-engagement state applies an elastic force for maintaining the engagement state of the second engaging portion 22H to the second engaging portion 22H or to the second engaged portion 112A. In such a configuration, when the movable rail 12 slides within the fixed rail 11, the inner closure member 22 can be reliably inhibited from sliding in conjunction with such sliding of the movable rail 12.

The first engaging portion 22G is an elastically displaceable portion formed by a bent metal strip member. This can improve durability of the first engaging portion 22G as compared with a case in which the first engaging portion 22G is formed of resin.

The first engaged portion 122E is provided to the end cap 122 of resin. This makes it possible to easily manufacture the first engaged portion 122E.

When the first engaging portion 22G is in engagement with the first engaged portion 122E, the portion 23G of the outer closure member 23 is held between the movable rail 12 and the inner closure member 22 in the sliding directions.

This enables the inner closure member 22 and the outer closure member 23 to integrally slide together with the movable rail 12 when part of the movable rail 12 is positioned outside of the fixed rail 11. Accordingly, the inner closure member 22 and the outer closure member 23 can reliably slide together with the movable rail 12.

The second engaged portion 112A is provided to the retaining bracket 112 that retains the screw rod 111. This makes it possible to reduce the number of components of the sliding device 10.

3.3 Characteristics of Relationships between End Cap, Outer Closure Member, etc.

The opposed surface 23J opposed to the movable rail 12 (the end cap 122) is spaced apart from the movable rail 12 via the clearance 122F. This can inhibit the outer closure member 23 from being damaged even when the movable rail 12 is subjected to any load.

Specifically, even when the load is applied to the movable rail 12 to thereby flexurally deform the end cap 122 toward the opposed surface 23J of the outer closure member 23, the end cap 122 is inhibited from contacting the outer closure member 23.

Similarly, even when the end cap 122 is flexurally deformed toward the opposed surface 23J of the outer closure member 23, application of a large load to the outer closure member 23 due to contact of the end cap 122 with the outer closure member 23 is inhibited. Accordingly, occurrence of damage of the outer closure member 23 is inhibited.

Provision of the elastic portion 126 exerting the elastic force oriented in a direction to space the opposed surface 23J apart from the movable rail 12 enables the clearance 122F to be secured reliably. Accordingly, occurrence of damage of the outer closure member 23 is inhibited.

The elastic portion 126 is shaped like a flat spring extending from the end cap 122 into the rail body 121. In such a configuration, the elastic portion 126 is covered by the rail body 121. In other words, the elastic portion 126 is protected by the rail body 121. Furthermore, when the movable rail 12 is sliding, sliding sounds generated at a position in contact with the elastic portion 126 are inhibited from being transmitted to the occupant.

The first sliding-contact surface 124A of the first support portion 124 is inclined such that the first end 124B of the first sliding-contact surface 124A closer to the second wall 23B is higher than the second end 124C of the first sliding-contact surface 124A closer to the first wall 23A (see FIG. 20).

The second sliding-contact surface 125A is inclined such that the third end 125B of the second sliding-contact surface 125A closer to the first wall 23A is higher than the fourth end 125C of the second sliding-contact surface 125A closer to the second wall 23B (see FIG. 20). In such a configuration, the outer closure member 23 is inhibited from dropping off from the first support portion 124 and the second support portion 125.

The lower end of the first wall 23A and the lower end of the second wall 23B are supported by the first support portion 124 and the second support portion 125, respectively, in the state elastically displaced in the mutually approaching directions. This inhibits the outer closure member 23 from dropping off from the first support portion 124 and the second support portion 125.

In the sliding device 10, the upper end of the movable rail 12, the upper end of the outer closure member 23, the upper end of the inner closure member 22, and the upper end of the retaining bracket 112 are arranged in this order from above.

Thus, if the movable rail 12 is flexurally deformed greatly toward the opposed surface 23J, the inner closure member 22 may be damaged. However, occurrence of such damage can be inhibited in the sliding device 10 of the present embodiment.

Other Embodiments

For example, the sliding device 10 may be configured such that the inner closure member 22 receives a pressing force via the outer closure member 23.

For example, the sliding device 10 may be configured such that the inner closure member 22 and the outer closure member 23 are pressed by the rail body 121.

The first pressed portion 22F does not necessarily have to be provided to the forward-movement-direction end of the inner closure member 22. The second pressed portion 23E does not necessarily have to be provided to the forward-movement-direction end of the outer closure member 23.

The first pressed portion 22F and the second pressed portion 23E do not necessarily have to be positioned within the fixed rail 11 when the inner closure member 22 and the outer closure member 23 are in the state housed in the fixed rail 11.

The first pressed portion 22F does not necessarily have to be provided on a lower side of the inner closure member 22. The second pressed portion 23E does not necessarily have to be provided on a lower side of the outer closure member 23.

For example, the front end 23F and the end wall 22D may contact each other with substantially no contact surface pressure therebetween when the first pressing portion 122C is in contact with the first pressed portion 22F.

The inner closure member 22 does not necessarily have to comprise the first engaging portion 22G and the second engaging portion 22H.

The first engaging portion 22G in the non-engagement state does not necessarily have to apply an elastic force for maintaining the engagement state of the second engaging portion 22H to the second engaging portion 22H or to the second engaged portion 112A.

For example, the first engaging portion 22G may be formed of an elastically deformable resin material.

For example, the first engaged portion 122E may be provided to the rail body 121.

When the first engaging portion 22G of the inner closure member 22 is in engagement with the first engaged portion 122E, the portion 23G does not necessarily have to be held between the movable rail 12 and the inner closure member 22 in the sliding directions.

The sliding device 10 may comprise the second engaged portion 112A as an independent member.

For example, the sliding device 10 may comprise one of the inner closure member 22 or the outer closure member 23.

For example, the sliding device 10 may be configured such that the movable rail 12 (the end cap 122) and the opposed surface 23J are in sliding contact with each other.

The sliding device 10 does not necessarily have to comprise the elastic portion 126.

For example, the elastic portion 126 may be a spring provided to the opposed surface 23J or another type of spring.

For example, the first sliding-contact surface 124A of the first support portion 124 and the second sliding-contact surface 125A of the second support portion 125 do not necessarily have to be inclined with respect to the horizontal direction.

The lower end of the first wall 23A and the lower end of the second wall 23B do not necessarily have to be supported by the first support portion 124 and the second support portion 125, respectively, in the state elastically displaced in the mutually approaching directions.

For example, the sliding device 10 does not necessarily have to comprise the screw rod 111 and the nut 123A. The sliding device 10 may be configured such that the screw rod 111 is rotationally driven. The sliding device 10 may be configured such that the nut 123A is provided to the fixed rail 11 and such that the screw rod 111 is provided to the movable rail 12.

The above-described embodiments are each for a passenger car. However, applications of the present disclosure are not limited to this. The present disclosure can also be applied to seats used in other vehicles, such as railway vehicles, ships, and airplanes, and to stationary seats used at theaters, homes, and other places.

Furthermore, the present disclosure may be embodied in various forms conforming to the gist of the invention recited in the appended claims, and is not limited to the above-described embodiments. Thus, at least two of the above-described embodiments may be combined together.

What is claimed is:

1. A sliding device comprising:
    a fixed rail configured to be fixed to a vehicle, the fixed rail comprising an opening opened upward, the opening being arranged in a longitudinal direction of the fixed rail;
    a movable rail to which a seat body of a vehicle seat is configured to be fixed, the movable rail being slidable with respect to the fixed rail in a state where at least part of the movable rail is exposed through the opening;
    a first closure member slidable with respect to the fixed rail and capable of closing at least part of the opening, the first closure member receiving a force from the movable rail to thereby slide;
    a first engaging portion provided to the first closure member, the first engaging portion disengageably engaging with a first engaged portion provided to the movable rail; and
    a second engaging portion provided to the first closure member, the second engaging portion disengageably engaging with a second engaged portion provided to the fixed rail,
    wherein, at a forward movement in which a longitudinal end of the movable rail slides from a position inside the fixed rail to a position outside the fixed rail, an engagement state of the second engaging portion is released after the first engaging portion has entered an engagement state, and
    wherein, at a backward movement in which the movable rail slides in a direction opposite to that of the forward movement, the engagement state of the first engaging portion is released after the second engaging portion has entered the engagement state.

2. The sliding device according to claim 1,
    wherein the first engaging portion is elastically displaceable, and
    wherein the first engaging portion, when in a non-engagement state, applies an elastic force for maintaining the engagement state of the second engaging portion to the second engaging portion or to the second engaged portion.

3. The sliding device according to claim 1,
    wherein the first engaging portion is an elastically displaceable portion formed by a bent metal strip member.

4. The sliding device according to claim 1,
    wherein the movable rail comprises:
        a rail body of metal to which the seat body is configured to be fixed; and
        an end cap of resin attached to a longitudinal end of the rail body, and
    wherein the first engaged portion is provided to the end cap.

5. The sliding device according to claim 1, further comprising:
    a screw rod arranged within the fixed rail and extending in the longitudinal direction of the fixed rail; and
    a retaining bracket that retains the screw rod,
    wherein the movable rail comprises a nut engaged with the screw rod, and
    wherein the second engaged portion is provided to the retaining bracket.

6. The sliding device according to claim 1,
wherein the second engaging portion is formed by a concave portion into which the second engaged portion fits from a bottom portion of the second engaging portion.

7. A vehicle seat mounted to a vehicle, the vehicle seat comprising:
a seat body comprising at least a seat cushion; and
a sliding device according to claim 1 that supports the seat body in a slidable manner.

* * * * *